US007971265B2

(12) United States Patent
Tsusaka et al.

(10) Patent No.: US 7,971,265 B2
(45) Date of Patent: Jun. 28, 2011

(54) CONTENT MANAGEMENT SYSTEM

(75) Inventors: Yuko Tsusaka, Osaka (JP); Soichiro Fujioka, Osaka (JP); Natsume Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 922 days.

(21) Appl. No.: 11/918,783

(22) PCT Filed: Apr. 21, 2006

(86) PCT No.: PCT/JP2006/308459
§ 371 (c)(1),
(2), (4) Date: Oct. 18, 2007

(87) PCT Pub. No.: WO2006/115220
PCT Pub. Date: Nov. 2, 2006

(65) Prior Publication Data
US 2009/0077332 A1 Mar. 19, 2009

(30) Foreign Application Priority Data
Apr. 21, 2005 (JP) .................................. 2005-123219

(51) Int. Cl.
G06F 21/00 (2006.01)
(52) U.S. Cl. ............................................. 726/31; 726/26
(58) Field of Classification Search ........................ None
See application file for complete search history.

(56) References Cited

U.S. PATENT DOCUMENTS

| 2002/0181355 | A1 | 12/2002 | Shikunami et al. | |
|---|---|---|---|---|
| 2003/0077074 | A1 | 4/2003 | Okamoto et al. | |
| 2003/0187847 | A1 * | 10/2003 | Lubbers et al. | 707/9 |
| 2003/0221075 | A1 * | 11/2003 | Achiwa et al. | 711/162 |
| 2004/0010521 | A1 * | 1/2004 | Li et al. | 707/200 |
| 2005/0138315 | A1 * | 6/2005 | Eguchi et al. | 711/165 |
| 2005/0197965 | A1 | 9/2005 | Takabayashi et al. | |

FOREIGN PATENT DOCUMENTS

| JP | 2002-251819 | 9/2002 |
|---|---|---|
| JP | 2002-358241 | 12/2002 |
| JP | 2003-242038 | 8/2003 |
| JP | 2004-54988 | 2/2004 |
| JP | 2004-288083 | 10/2004 |
| JP | 2005-250881 | 9/2005 |

OTHER PUBLICATIONS

International Search Report issued May 23, 2006 in the International (PCT) Application of which the present application is the U.S. National Stage.

* cited by examiner

*Primary Examiner* — Minh Dinh
*Assistant Examiner* — David Le
(74) *Attorney, Agent, or Firm* — Wenderoth, Lind & Ponack, L.L.P.

(57) ABSTRACT

A content management system constructed by a plurality of storage apparatuses that can communicate with one another. A 1st storage apparatus, which is one of the storage apparatuses, stores therein, in correspondence, a content and copy destination information and sends the content and the copy destination information therefrom to a 2nd storage apparatus, which is another one of the storage apparatuses. Yet another one of the storage apparatuses that is indicated by the copy destination information stores therein, in correspondence, the content and copy source information and, after the 1st storage apparatus has sent the content and the copy destination information to the 2nd storage apparatus, rewrite the copy source information such that the copy source information indicates the 2nd storage apparatus.

20 Claims, 16 Drawing Sheets

FIG. 3A

| SERVER | CLIENT | CLIENT | CLIENT |
|---|---|---|---|
| A | B | C | D |

| ID | CONTENT NAME | COPY DESTINATION APPARATUS ID | COPY HISTORY |
|---|---|---|---|
| ID1 | WWWW | B | 2005/1/21 10:05:20 |
| ID2 | XXXX | C | 2004/10/2 18:25:40 |
| ID3 | YYYY | D | 2004/12/21 01:24:20 |
| ID4 | ZZZZ | — | — |

| OLD ID | CONTENT NAME | MOVE DESTINATION APPARATUS ID |
|---|---|---|
| ID2 | XXXX | B |

| CONTENT NAME | PARENT APPARATUS ID | ID |
|---|---|---|
| WWWW | A | ID1 |

| CONTENT NAME | PARENT APPARATUS ID | ID |
|---|---|---|
| XXXX | A | ID2 |

| CONTENT NAME | PARENT APPARATUS ID | ID |
|---|---|---|
| YYYY | A | ID3 |

1851, 1852, 1853, 1850

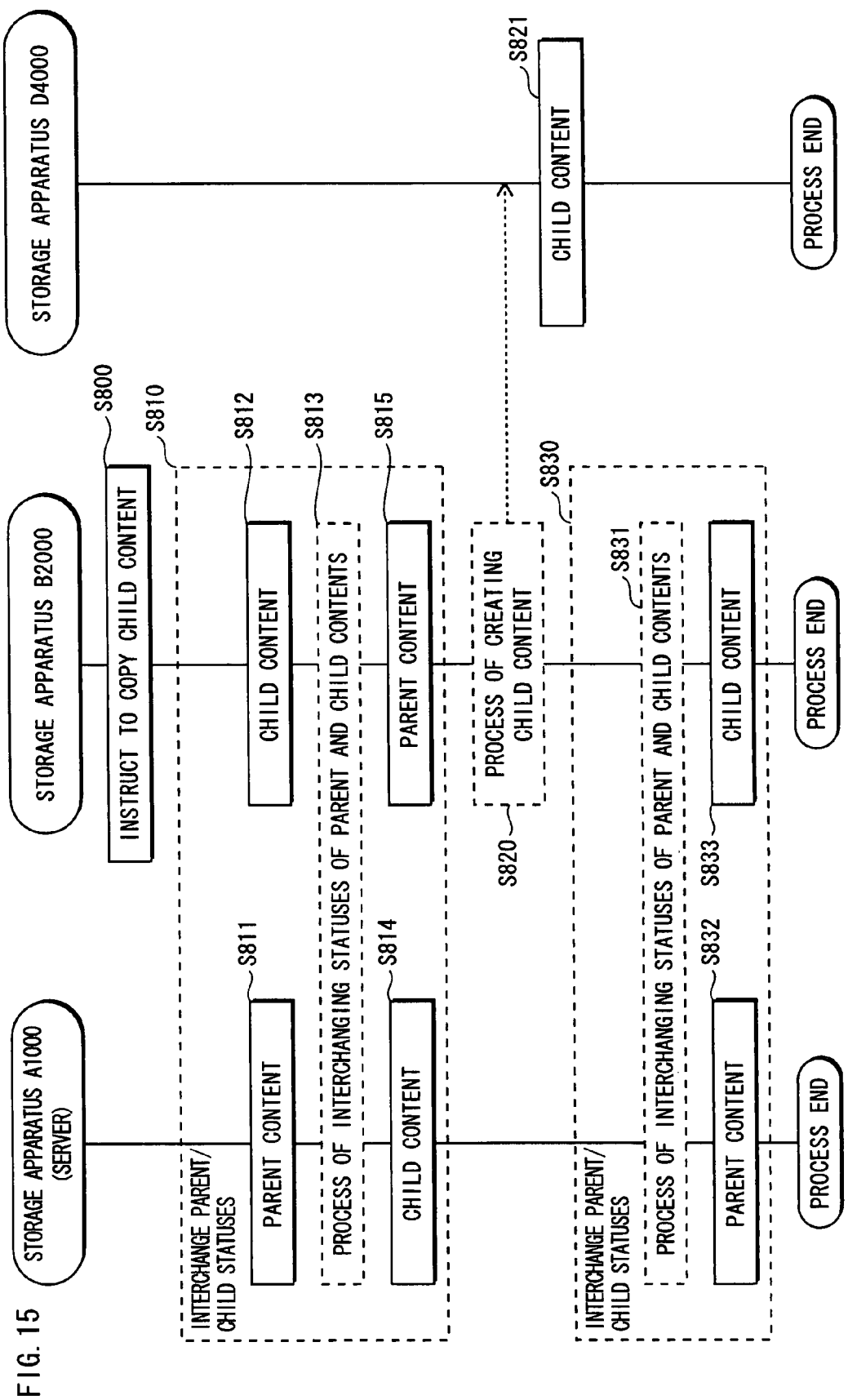

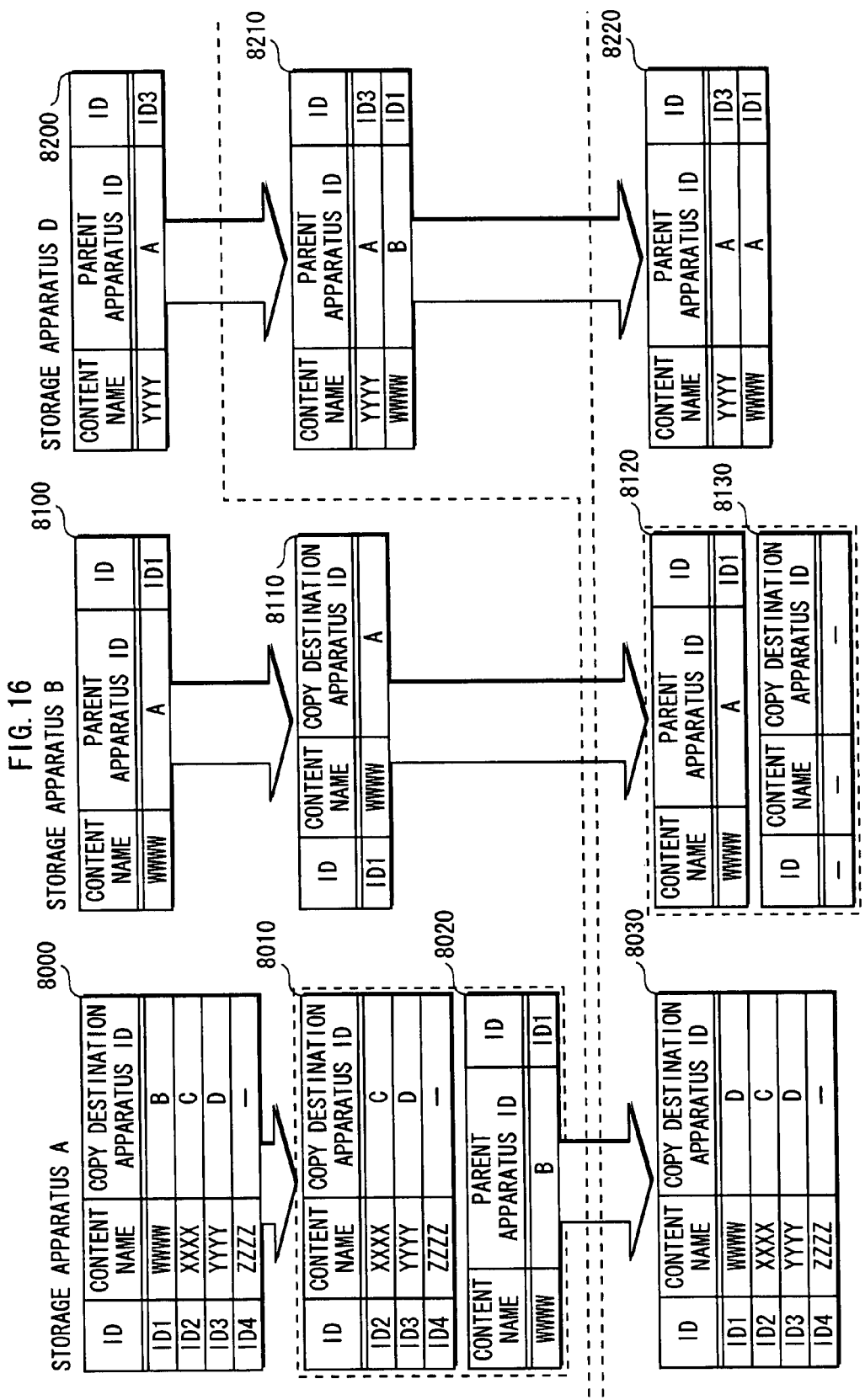

CONTENT MANAGEMENT SYSTEM

TECHNICAL FIELD

The present invention relates to technology for managing a digital content such as digital video and digital audio, and especially to technology for improving user-friendliness for content users while protecting the rights of a copyright holder.

BACKGROUND ART

Digitally reproduced video and audio, namely digital contents, can be copied without deterioration in quality. In order to protect the rights of a copyright holder, many copyright protection systems have been proposed.

One example of such systems is a serial copy management system (SCMS) that limits the number of times a digital content can be copied from a recording medium, such as a compact disc (CD) and a digital versatile disc (DVD).

Another example is Secure Digital Music Initiative (SDMI) that restricts distribution of the digital content, such as music, via the Internet. SDMI limits the number of times the digital content can be copied from a server apparatus (hereafter, simply "server") to a different apparatus or a recording medium, such as a mini disc (MD).

In recent years, broadcast stations distribute CCI (Copy Control Information)-added contents by a digital broadcasting system (e.g., BS digital, CS digital and terrestrial digital broadcasts) to restrict copying of the contents. CCI is information that restricts copying of content; with CCI, it is possible to restrict an unauthorized person from copying the content, and to limit the number of times the content can be copied.

The above are examples of methods for protecting the rights of a copyright holder pertaining to the distribution of the digital content.

On the other hand, restricting the copying of the content may lead to a situation where a user finds it inconvenient to watch or listen to the distributed content.

Such a situation is, for example, when the user has no freedom to choose an apparatus to play the content with because there are restrictions imposed on the copying of the content.

In recent years, digital household appliances are connected to one another via a network so as to establish a home network, in which digital data can be freely exchanged between the digital household appliances. Moreover, the development of various types of mobile apparatuses has even enabled family members to watch or listen to the content outside the network.

Regardless of such technological advances, there still are cases where the user cannot enjoy the content to the fullest extent even in the network, because copying of the content is permitted only once and thus further copying of the content is entirely restricted. For example, if the user has content that only allows a first-generation copy thereof, once the user copies the content to a personal computer, the user cannot make further copies of the content anymore. With further copying of the content disabled, the user cannot take the content outside the network by copying the content to a mobile device.

In light of the above disadvantages, engineers have developed technology for enabling copying of content within the home network while protecting the rights of a content holder. According to this technology, a copy-restricted content is registered in an in-home server. This structure allows copying of the content with the in-home server controlling copies of the content within the home network (ref. patent document 1). In terms of the earlier example, this technology permits the content to be copied to the mobile device under the condition that the copy of the content in the personal computer gets invalidated. This technology also permits the content to be moved from one server to another under the condition that copies of the content that has been stored in the server do not exist.

[Patent document 1]
Japanese Laid-Open Patent Application Publication No. 2004-54988

SUMMARY OF THE INVENTION

The Problems the Invention is Going to Solve

There are many disadvantages to having only one in-home server manage the content and its copies.

For example, while one of the family members is taking the content outside the home network by copying the content to the mobile device, the content in the in-home server can be played back, but cannot be taken outside the home network by moving the content to a mobile device. In other words, although the family members should be allowed to have the original content and its copy, the original content needs to stay within the in-home server.

Another example of the aforementioned disadvantages is that, if a malfunction occurs in the in-home server while the copy of the content is being taken outside the home network, the content cannot be moved from the in-home server because the copy of the content exists.

Yet another such example is that, even when the family members are in need of moving the content to a different server according to a size and type of the content, they cannot do so for the same stated reason.

In this regard, the present invention aims to provide a content management system that allows content to be freely moved between in-home-network apparatuses while protecting the rights of a content copyright holder.

Means to Solve the Problems

In order to achieve the above aim, the present invention provides a content management system constructed by a plurality of storage apparatuses that can communicate with one another, wherein a 1st storage apparatus, which is one of the storage apparatuses, stores therein, in correspondence, (i) a content and (ii) copy destination information indicating one of the storage apparatuses to which the content has been sent, and includes: a send unit operable to send the content and the copy destination information therefrom to a 2nd storage apparatus, which is another one of the storage apparatuses and is not indicated by the copy destination information; and a delete unit operable to delete the content and the copy destination information therefrom, the 2nd storage apparatus includes an add unit operable to additionally store therein, in correspondence, the content and the copy destination information received from the 1st storage apparatus, and the one of the storage apparatuses indicated by the copy destination information stores therein, in correspondence, (i) the content and (ii) copy source information indicating one of the storage apparatuses from which the content has been received, and includes a rewrite unit operable to, after the 1st storage apparatus has sent the content and the copy destination information to the 2nd storage apparatus, rewrite the copy source information such that the copy source information indicates the 2nd storage apparatus.

EFFECTS OF THE INVENTION

By having the above structure, the content management system of the present invention allows a child content to acknowledge that a parent content has been moved to a different apparatus. Accordingly, it is possible for the child content to make requests for necessary processes or the like to the storage apparatus storing the parent content. One example of such necessary processes is to request the storage apparatus to extend a time period for which the child content is valid. When connecting to the server for the purpose of extending the aforementioned time period, the child content needs to have the above acknowledging function.

In the content management system, the send unit may send the content and the copy destination information to the 2nd storage apparatus only when the 2nd storage apparatus is a designated storage apparatus.

This structure permits the send unit to send the content only to the designated storage apparatus. This way it is possible to limit the content to in-home-network use.

Consequently, this structure protects the copyrights of a content holder.

To achieve the above aim, the present invention also provides a storage apparatus which is one of a plurality of storage apparatuses that can communicate with one another and construct a content management system, the storage apparatus comprising: a storage unit storing therein, in correspondence, (i) a content and (ii) copy destination information indicating one of the storage apparatuses to which the content has been sent; a send unit operable to send the content and the copy destination information to a predetermined storage apparatus which is another one of the storage apparatuses and is not indicated by the copy destination information; and a delete unit operable to delete the content and the copy destination information from the storage unit.

To achieve the above aim, the present invention also provides a storage apparatus which is one of a plurality of storage apparatuses that can communicate with one another and construct a content management system, the storage apparatus comprising: a storage unit storing therein, in correspondence, (i) a content and (ii) copy source information indicating one of the storage apparatuses that stores therein a parent content from which the content has been copied, a reception unit operable to receive latest copy source information and content information that identifies the content, and a rewrite unit operable to rewrite the existing copy source information into the received latest copy source information.

The aforementioned structure can facilitate the construction of the content management system of the present invention.

To achieve the above aim, the present invention also provides a content management system constructed by a plurality of storage apparatuses that can communicate with one another, wherein a 1st storage apparatus, which is one of the storage apparatuses, stores therein, in correspondence, (i) a content and (ii) copy destination information indicating one or more of the storage apparatuses, including a 2nd storage apparatus, which is another one of the storage apparatuses and to which the content has been sent, and includes: a send unit operable to send the copy destination information therefrom to the 2nd storage apparatus, the copy destination information indicating the one or more of the storage apparatuses excluding the 2nd storage apparatus; and a unit operable to delete the copy destination information therefrom and newly store therein, in correspondence with the content, information indicating the 2nd storage apparatus as the copy source information, and the 2nd storage apparatus stores therein, in correspondence, (i) the content and (ii) copy source information indicating one of the storage apparatuses that stores therein a parent content from which the content has been copied, and includes a unit operable to delete the copy source information and newly store therein, in correspondence with the content, the copy destination information received from the 1st storage apparatus.

This structure interchanges parent/child statuses of the parent content and the child content by sending and receiving the copy destination information and the copy source information. This way the parent content can be converted into the child content and the child content can be converted into the parent content with less time, compared to when the sending and receiving of the content itself is required.

In order to achieve the above aim, the present invention also provides a storage apparatus which is one of a plurality of storage apparatuses that can communicate with one another and construct a content management system, the storage apparatus comprising: a storage unit storing therein, in correspondence, (i) a content and (ii) copy destination information indicating one or more of the storage apparatuses, including a predetermined storage apparatus which is another one of the storage apparatuses and to which the content has been sent; a send unit operable to send, to the predetermined storage apparatus, the copy destination information indicating the one or more of the storage apparatuses excluding the predetermined storage apparatus; and a unit operable to delete the copy destination information from the storage unit and newly store thereto, in correspondence with the content, information indicating the predetermined storage apparatus as the copy source information.

In order to achieve the above aim, the present invention also provides a storage apparatus constituting a plurality of storage apparatuses that can communicate with one another and construct a content management system, the storage apparatus comprising: a storage unit storing therein, in correspondence, (i) a content and (ii) copy source information indicating one of the storage apparatuses that stores therein a parent content from which the content has been copied; a reception unit operable to receive copy destination information and content information that identifies the content; and a unit operable to delete the copy source information from the storage unit and newly store thereto, in correspondence with the content, the received copy destination information.

The aforementioned structure can facilitate the construction of the content management system of the present invention.

BRIEF DESCRIPTION OF THE DRAWINGS

FIGS. 3A through 3C show exemplary contents of management information stored in a management information storage unit 1800 of a server. Specifically, FIG. 3A shows an exemplary structure and exemplary contents of a connected apparatus table 1810, FIG. 3B shows an exemplary structure and exemplary contents of a parent content table 1820, and FIG. 3C shows an exemplary structure and exemplary contents of a move destination table 1830.

FIGS. 4A through 4C show exemplary structures and contents of a child content table 1850. Specifically, FIGS. 4A, 4B and 4C show the child content table 1850 of a storage apparatus B2000, a storage apparatus C3000, and a storage apparatus D4000, respectively.

FIG. 15 is a flowchart showing processes performed by the storage apparatuses for making the copy of the child content.

FIG. 16 is a diagram showing how storage apparatus management information changes when making the copy of the child content.

DESCRIPTION OF CHARACTERS

Figure 1:
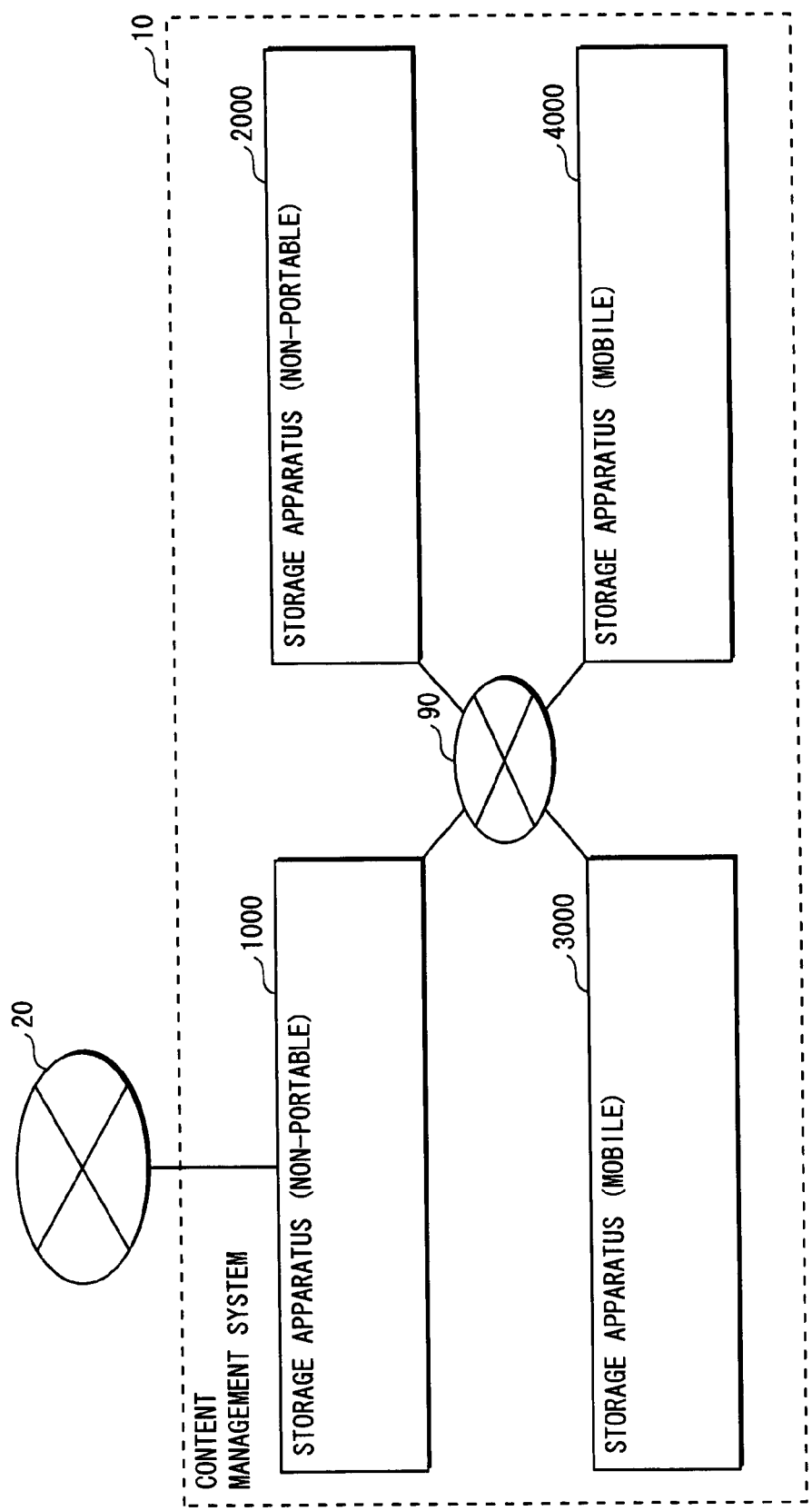
FIG. 1 shows an exemplary structure of a content management system of the present invention.

1000, 2000, 3000 and 4000 Storage Apparatuses
1100 Reception Unit
1200 Write Unit
1300 Content Storage Unit
1400 Read Unit
1500 Send Unit
1600 Control Unit
1700 Content Information Management Unit
1800 Management Information Storage Unit
1810 Connected Apparatus Table
1820 Parent Content Table
1821 and 1853 IDs
1822 Content Name
1823 Copy Destination Apparatus ID
1824 Copy History
1830 Move Destination Table
1850 Child Content Table
1851 Content Name
1852 Parent Apparatus ID
1853 Copy Destination Apparatus ID
1900 Input Unit
1950 Output Unit

DETAILED DESCRIPTION OF THE INVENTION

<Overview>

In order to protect a copyright of a content within a home network, the original content (hereafter "parent content") should be stored only in a predetermined server, and a copy of the parent content (hereinafter "child content") should be well managed and controlled. The child content should be limited in number as well.

That is to say, the server needs to acknowledge an apparatus the child content is stored in. It is not permitted to move the child content to another apparatus without the serve's acknowledgement.

Also, in terms of the development of mobile devices, it is essential, for the purpose of copyright protection to validate the use of the child content within the home network, and to set a predetermined time period for which the child content is valid when the child content is outside the home network.

In the above implementation, the child content becomes invalid after the predetermined time period has passed since the child content was taken outside the home network by way of a mobile device or the like. This way the mass distribution of the child content can be prevented.

There is one practical method for invalidating the child content after the predetermined time period has passed since the child content was taken outside the home network: it is to make an apparatus storing the child content access the server periodically, so that the server can confirm the presence of the child content within the home network.

Therefore, if the parent content is moved from the original server to another server, the apparatus storing the child content does not know another server thus cannot access thereto. Consequently, the child content gets invalidated even it is actually within the home network.

In order to avoid such a situation, only the parent content that has no copies thereof can be moved to another server.

Given the above factors, the content management system of the present invention is intended to relieve the limitation on the moving of the parent content, and to enable the moving of a parent content that has its child contents as well as the child contents.

The following describes an embodiment of the content management system of the present invention.

In this embodiment, it is regarded that one parent content can create a plurality of child contents which are to be deleted after a predetermined time period has passed. Here, the deletion of the child contents may be achieved by erasing the child contents from a memory, or by disabling the decoding of the child contents if the content has been encoded. When the child contents become unable to be played back, the deletion of the copies can be said to have been achieved.

It is also regarded that, while the apparatus storing the child content is being connected to the home network (i.e., until deletion of the child content), the content management system does not count the time period for which the child content is valid. If the apparatus storing the child content gets re-connected to the home network after having been taken outside the home network, the content management system voids the time it has counted. There are no restrictions imposed on the use of the child content time wise, as long as a user enjoys it within the home network. However, if the user takes the child content outside the home network, the child content will be deleted after the predetermined time period has passed. This way the distribution of the child content can be prevented, and thus the rights of a copyright holder are protected.

<Structure>

FIG. 1 shows an exemplary structure of the content management system of the present invention.

As shown in FIG. 1, a content management system 10 includes storage apparatuses 1000, 2000, 3000 and 4000. These storage apparatuses are connected to one another via a home network 90.

The storage apparatuses 1000 and 2000 are non-portable storage apparatuses such as personal computers. The storage apparatuses 3000 and 4000 are mobile storage apparatuses such as mobile phones.

Only the storage apparatus 1000 is connected to a network 20 that is outside the home network.

This network 20 is a large-scale network such as the Internet and CATV (cable television). The network 20 should not be limited to the Internet or the like, but is to include digital broadcasts carried by broadcast stations. In other words, the network 20 achieves its functions as long as it serves as a path through which the storage apparatus 1000 acquires a content from the home network.

The home network 90 is a small-scale, in-home network constructed by a wireless LAN and the like.

Figure 2:
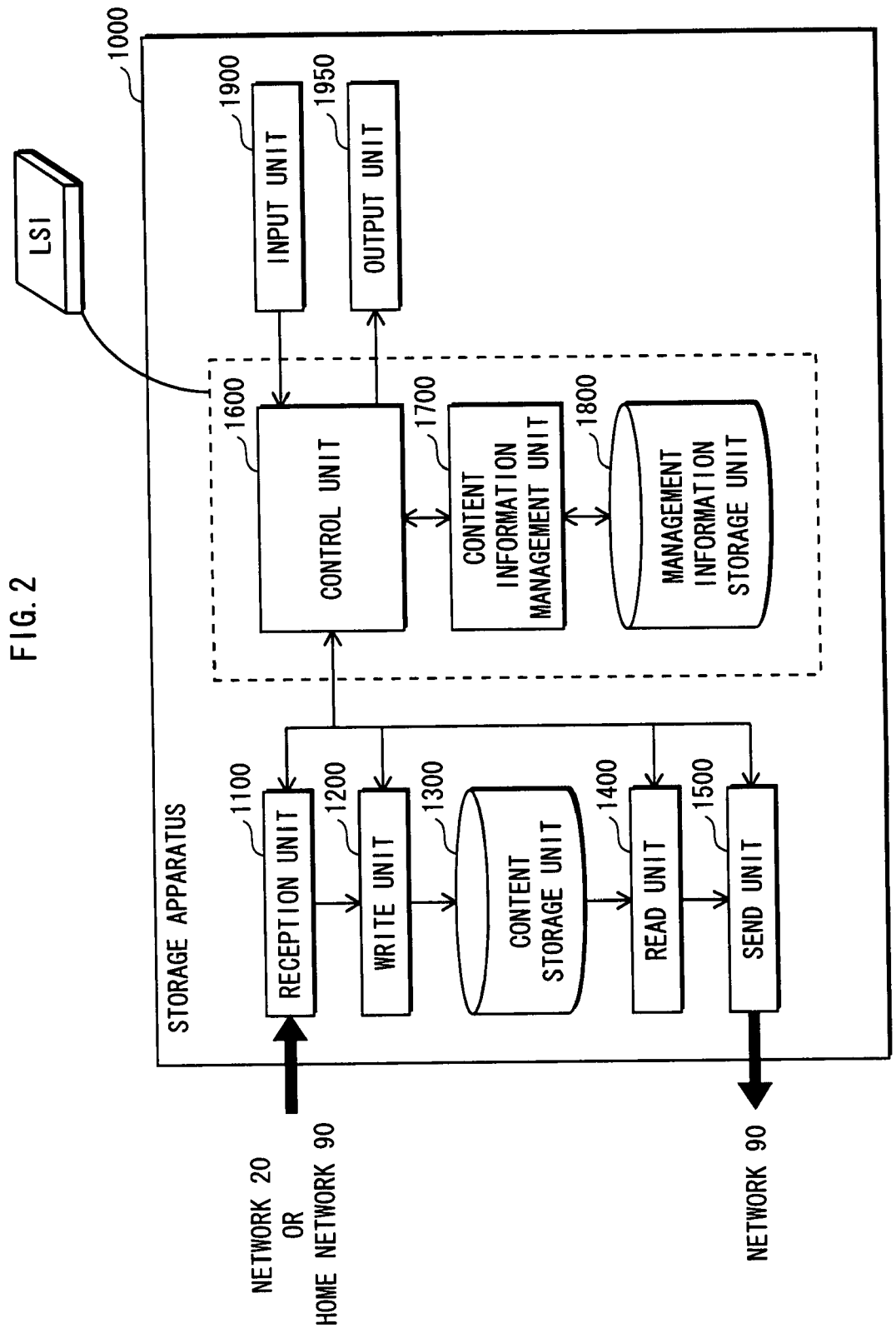
FIG. 2 is a functional block diagram showing the structure of a storage apparatus 1000.

The following describes the structure of the storage apparatuses with reference to FIG. 2.

Each of the storage apparatuses (1000, 2000, 3000 and 4000) has characteristics that are commonly found in a normal storage apparatus. For example, if the storage apparatuses are personal computers, they have a function of executing an application such as a game. Likewise, if the storage apparatuses are mobile phones, they have a communication function and the like. In addition to these normal functions, each of the storage apparatuses (1000, 2000, 3000 and 4000) of the present invention also holds unique functions that are original to themselves.

The storage apparatuses share the same stated unique functions that are peculiar to the present invention. These unique functions are described below with reference to FIG. 2 by taking the storage apparatus 1000 as an example. There are cases where some of these storage apparatuses have different functions from the rest of the storage apparatuses; specifics of these different functions will be explained later on a case-by-case basis.

FIG. 2 is a functional block diagram showing the structure of the storage apparatus 1000.

The storage apparatus 1000 includes a reception unit 1100, a write unit 1200, a content storage unit 1300, a read unit 1400, a send unit 1500, a control unit 1600, a content information management unit 1700, a management information storage unit 1800, an input unit 1900, and an output unit 1950.

The control unit 1600 has a function of controlling aftermentioned functional components that achieve the aforementioned unique functions peculiar to the present invention. It should be noted that functional components that achieve normal functions of the storage apparatus 1000 are not explained herein.

The reception unit 1100 has a function of receiving, via the network, a content and the like from an outside source, and providing the received content to the write unit 1200.

Here, the storage apparatus 1000 receives the content and the like via the network 20, whereas other storage apparatuses (2000, 3000 and 4000) receive the content and the like via the home network 90.

The write unit 1200 has a function of writing the provided content into the content storage unit 1300. The write unit 1200 also has a function of informing the control unit 1600 of, in correspondence, (i) the content and (ii) an address of the content storage unit 1300 in which the content is stored. Once having been informed to the control unit 1600, the address and the like are managed by the content information management unit 1700.

The content storage unit 1300 has a function of storing the content that has been written thereto by the write unit 1200. Here, the content storage unit 1300 stores the content without distinguishing the parent content and the child content.

The read unit 1400 has a function of reading the content stored in the content storage unit 1300, and providing the read content to the send unit 1500. The read unit 1400 performs this reading when the control unit 1600 specifies an address of the content storage unit 1300 and instructs the read unit 1400 to perform the reading.

The send unit 1500 has a function of sending the content provided by the read unit 1400 to another storage apparatus via the home network 90. Here, the control unit 1600 specifies a specific storage apparatus to which the content should be sent.

The content information management unit 1700 has a function of managing the content stored in the content storage unit 1300. More specifically, the content information management unit 1700 writes various information into the management information storage unit 1800, deletes the information, and so on under the instructions of the control unit 1600. The aforementioned information refers to tables stored in the management information storage unit 1800, the tables showing various items including (i) the address of the content storage unit 1300 in which the content is stored, (ii) information indicating whether the content is the parent content or the child content, and (iii) if the content is the parent content, a storage apparatus in which the child content is stored. The content information management unit 1700 further has other functions, such as referencing information stored in the management information storage unit 1800 and sending the information to a certain destination as requested by the control unit 1600.

The management information storage unit 1800 has a function of storing various tables, namely the management information, each of which corresponds to the content stored in the content storage unit 1300. These tables are stored, updated or deleted under instructions of the content information management unit 1700. Details of the information stored in the management 15, information storage unit 1800 are described with reference to FIGS. 3 and 4 in the <Data> section below.

The input unit 1900 and the output unit 1950 are so-called user interfaces. The input unit 1900 includes a remote control, operation keys, etc., and has functions of receiving instructions from a user and delivering the received instructions to the control unit 1600.

The output unit 1950 includes a display and the like. The output unit 1950 has functions of playing back and outputting the content, displaying a message to the user, etc.

Each of the storage apparatuses (1000-4000) has a CPU (not illustrated), and achieves its functions with the CPU executing programs stored in a memory or a hard disc (not illustrated) thereof.

<Data>

The following describes, with reference to FIGS. 3A through 4C, the principle data used in the content management system of the present invention.

The data described in this section is stored in the management information storage unit 1800 of each storage apparatus (1000-4000). It should be noted that each storage apparatus does not necessarily store all types of information therein; it stores only data that corresponds to a content stored therein at that time. For example, if each storage apparatus does not store the parent content, then it does not store information that is used for managing the parent content.

The data is created, deleted or updated as necessary in the course of making a copy of the content or moving the content to a different storage apparatus.

FIGS. 3A through 3C show exemplary contents of management information stored in the management information storage unit 1800 of a server. Here, the server refers to a storage apparatus storing a parent content therein. In the present content management system, it is regarded that there is more than one server and different servers store different parent contents.

FIG. 3A shows an exemplary structure and exemplary contents of a connected apparatus table 1810. FIG. 3B shows an exemplary structure and exemplary contents of a parent content table 1820. Note that the connected apparatus table and the parent content table 1820 are part of the management information. FIG. 3C shows an exemplary structure and exemplary contents of a move destination table 1830.

Other than these, the management information includes a table showing, in correspondence, (i) a content and (ii) an address of the content storage unit 1300 in which the content is stored.

The connected apparatus table 1810 are used for managing storage apparatuses that are connected to the home network.

In the present embodiment, four storage apparatuses are connected to the home network 90. The storage apparatuses 1000, 2000, 3000 and 4000 are assigned different apparatus IDs which are, respectively, "A", "B", "C" and "D". Hereinafter, for the purpose of simplicity, the storage apparatus assigned the apparatus ID "A" is referred to as a "storage apparatus A", and the same rule applies to the rest of the storage apparatuses.

The connected apparatus table 1810 includes a server 1811 and a client 1812.

The server 1811 is a storage apparatus that stores the connected apparatus table 1810.

In FIG. 3A, for example, the server 1811 being "A" means that the storage apparatus assigned this ID "A", namely the storage apparatus 1000, stores the connected apparatus table 1810 and at least one parent content.

The following describes the parent-content table 1820 shown in FIG. 3B.

The parent content table 1820 is used for managing a parent content stored in a storage apparatus that stores the parent content table 1820. That is, the storage apparatus is a server of a content that is being managed by the parent content 1820. Or to put it another way, a storage apparatus that does not store the parent content table 1820 is not a server.

The parent content table 1820 includes an ID 1821, a content name 1822, a copy destination apparatus ID 1823, and a copy history 1824.

The ID 1821 is an identifier of a content.

The content name 1822 is a name of a parent content (e.g., a program title and music title).

The copy destination apparatus ID 1823 shows an apparatus ID of a storage apparatus to which the parent content indicated by the ID 1821 has been copied.

The copy history 1824 shows, by date and time, when the parent content that is indicated by the ID 1821 is copied to the storage apparatus that is indicated by the copy destination apparatus ID 1823.

In FIG. 3B, for example, the parent content whose ID 1821 is "ID1" is named "WWWW" (the content name 1822), and has been copied to the storage apparatus "B" (the copy destination apparatus ID 1823) on Jan. 21, 2005 at 10:05:20 (the copy history 1824).

Although the content has been copied to only one copy destination apparatus in the above example, it may be copied to more than one copy destination apparatus in accordance with restrictions on the number of times the content can be copied.

The copy destination table 1830 in FIG. 3C shows an apparatus to which the parent content has been moved. There is no such case where the move destination table 1830 and the parent content table 1820 include the same content concurrently.

The move destination table 1830 includes an old ID 1831, a content name 1832 and a move destination apparatus ID 1833.

The old ID 1831 is an identifier of the parent content that has been moved.

The content name 1832 is a name of the parent content indicated by the old ID 1831.

The move destination apparatus ID 1833 is an apparatus ID of an apparatus to which the parent content has been moved.

For example, FIG. 3C shows that the content whose old ID 1831 is "ID2" and content name 1832 is "XXXX" has been moved to the storage apparatus indicated by "B", the move destination apparatus ID 1833.

FIGS. 4A through 4C show exemplary structures and contents of a child content table 1850. The child content table 1850 is stored in a storage apparatus indicated by the copy destination apparatus ID 1823 shown in the parent content table 1820. In other words, the child content table 1850 is used for managing the apparatus that stores the parent content, i.e., the apparatus from which the child content has been copied.

The child content table 1850 includes a content name 1851, a parent apparatus ID 1852 and an ID 1853.

The content name 1851 is a name of a child content. Although the parent content and the child content share the same name in the present embodiment, the apparatus that stores the child content may give the child content a different name from that of the parent content.

The parent apparatus ID 1852 shows an ID of the storage apparatus in which the parent content of the child content indicated by the content name 1851 is stored.

The ID 1853 is an identifier of a child content, and is the same as the identifier of the parent content.

Although not illustrated in the present exemplary structures of the child content table, it is regarded that the time period for which the child content is valid is stored and counted for each child content. When the information included in the child content table 1850 is sent to another storage apparatus, the counted time period and the like are sent to another storage apparatus together with the aforementioned information.

FIGS. 4A, 4B and 4C show the child content tables 1850 stored in a storage apparatus B2000, a storage apparatus C3000, and a storage apparatus D4000, respectively.

For example, as shown in FIG. 4A, the child content table 1850 in the storage apparatus B2000 includes the child content named "WWWW" (the content name 1851).

Although the present embodiment depicts a case where the parent content has only one child content, the parent content may have more than one child content.

As is explained above, the parent content tells which apparatus stores the child content, and contrarily, the child content tells which apparatus stores the parent content. By having the parent content and the child content linked to each other interactively, the number of the child content can be managed while allowing the parent content and the child content to be freely moved. This way the rights of the copyright holder can be protected.

<Operations>

The following describes operations of the aforementioned content management system 10 with reference to FIGS. 5 through 16.

This section describes processes performed by the content management system 10 in the following four cases.

The first case is when moving a parent content with a valid child content existing to a different storage apparatus. The second case is when interchanging the parent/child statuses (hereafter, simply statuses) of the parent content and the child content, i.e., when converting the parent content into the child content and the child content into the parent content.

The third case is when moving the child content to a different storage apparatus. The fourth case is when creating another child content from the child content.

<1. Process for Moving Parent Content>

Figure 5:
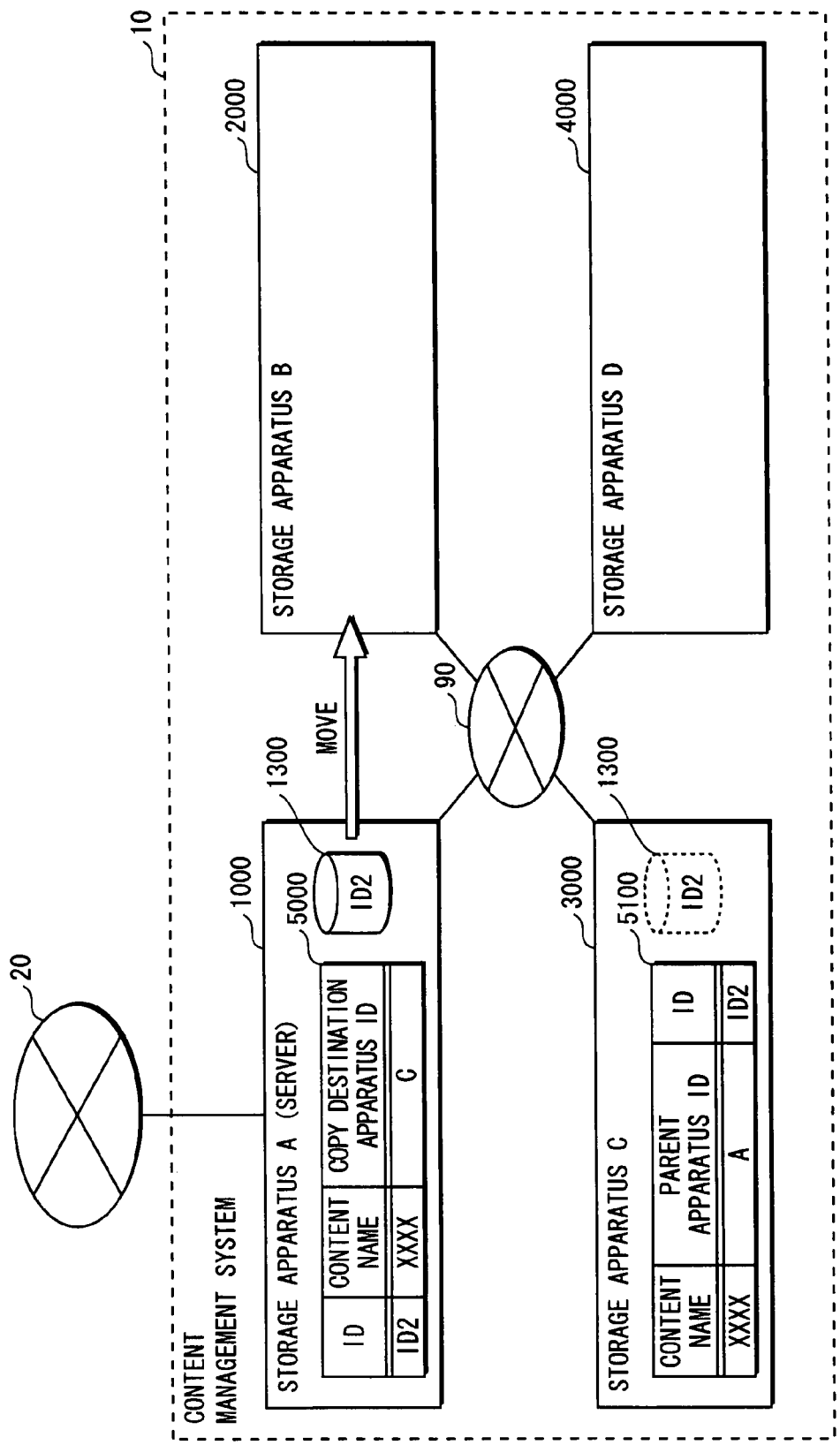
FIG. 5 is a diagram showing contents and content management information stored in the storage apparatuses of the content management system, in the case of moving the parent content to another storage apparatus.
Figure 6:
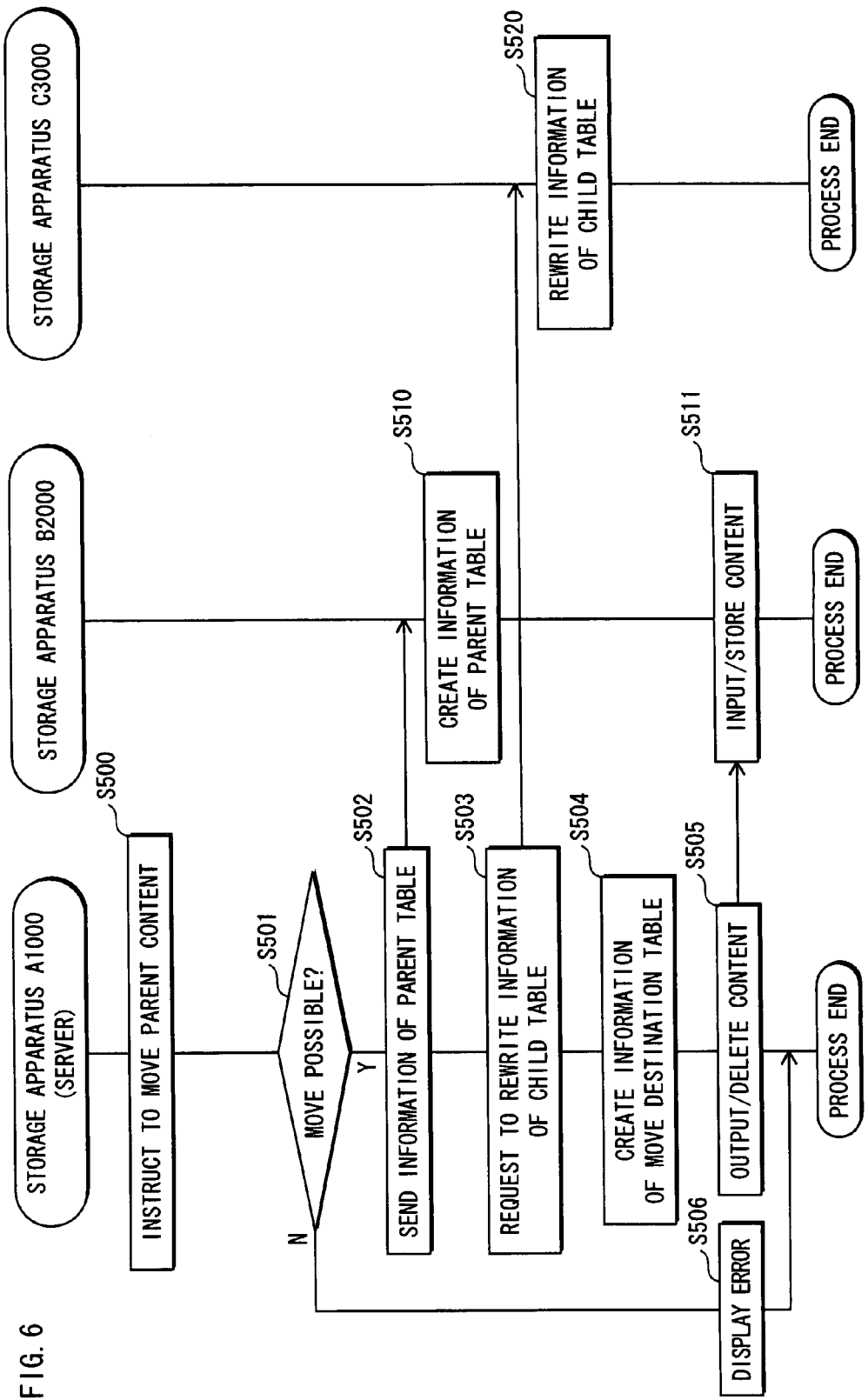
FIG. 6 is a flowchart showing processes performed by the storage apparatuses for moving the parent content to another storage apparatus.
Figure 7:
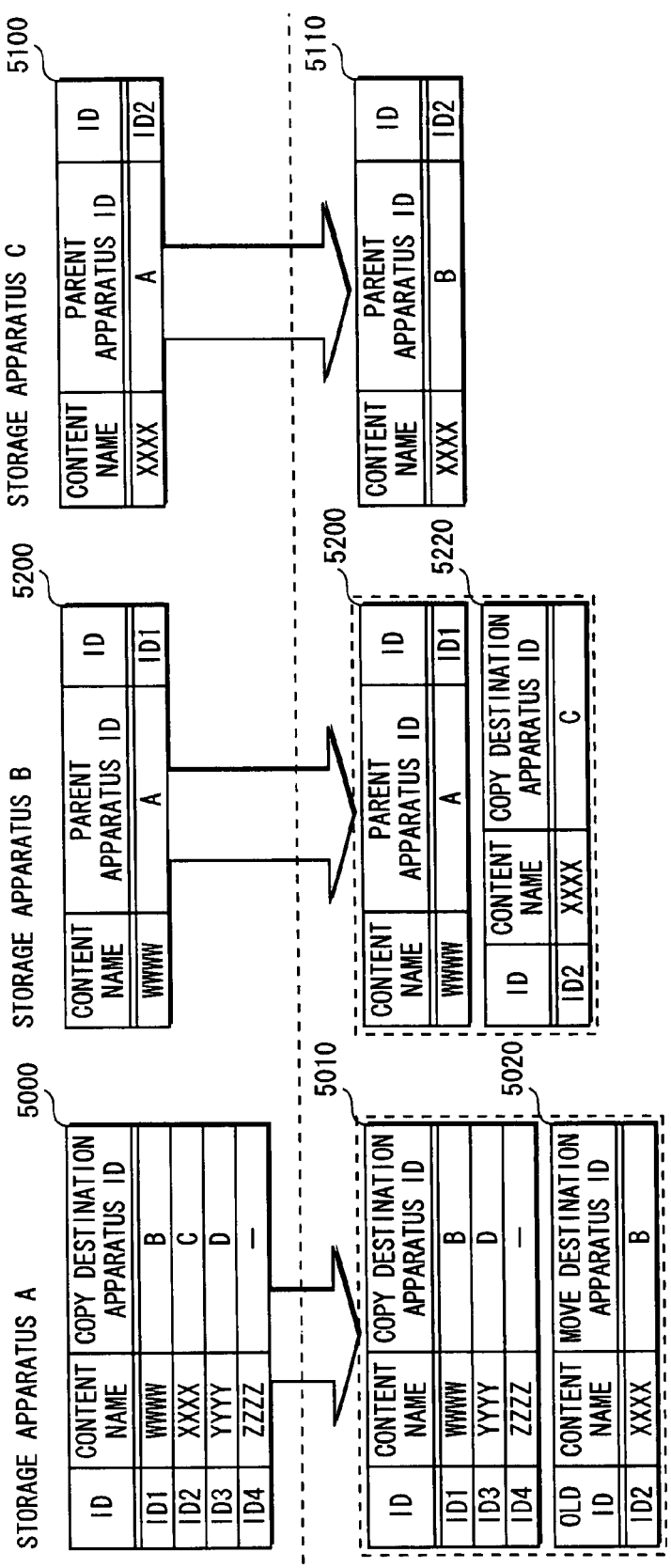
FIG. 7 is a diagram showing how storage apparatus management information changes when moving the parent content to another storage apparatus.

Described below with reference to FIGS. 5 through 7 is a process for moving the parent content to a different storage apparatus.

FIG. 5 is a diagram showing contents and content management information stored in the storage apparatuses of the content management system. FIG. 6 is a flowchart showing processes performed by the storage apparatuses. FIG. 7 is a diagram showing how storage apparatus management information changes when moving the parent content to another storage apparatus.

The tables shown in FIG. 7 are stored in the management information storage units 1800 of the storage apparatuses A, B and C. FIG. 7 shows how these tables change by arranging them in time series as indicated by arrows.

Note that FIGS. 5 and 7 only show items that are necessary for the sake of explanation (the same rule applies to FIGS. 8 through 16 as well).

Described hereinafter is a case where the parent content stored in the storage apparatus A1000 is moved to the storage apparatus B2000. Here, it is regarded that a child content of the above parent content is stored in the storage apparatus C3000.

As shown in FIG. 5, a parent content table 5000 is stored in the management information storage unit 1800 of the storage apparatus A1000. The ID 1821, the content name 1822 and the copy destination apparatus ID 1823 of the parent content are, respectively, "ID2", "XXXX" and "C". The content storage unit 1300 of the storage apparatus A1000 stores the content assigned the ID 1821 "ID2". That is, regarding this content, the storage apparatus A1000 is a server.

It is regarded that the storage apparatus A1000 stores other parent contents as well (see the parent content table 5000 in FIG. 7).

A child content table 5100 is stored in the management information storage unit 1800 of the storage apparatus C3000. The content name 1851, the parent apparatus ID 1852 and the ID 1853 of the child content are, respectively, "XXXX", "A" and "ID2" (see the child content table 5100 in FIG. 7). The content storage unit 1300 of the storage apparatus C3000 stores the child content that has been copied from the content whose ID 1823 is "ID2".

Here, it is regarded that the child content table 5200 is stored in the management information storage unit 1800 of the storage apparatus B2000. Accordingly, the content storage unit 1300 of the storage apparatus B2000 stores the child content whose content name 1851, parent apparatus ID 1852 and ID 1853 are "WWWW", "A" and "ID1", respectively (see the child content table 5200 in FIG. 7).

In the drawings, the content storage unit 1300 stores a parent content if outlined by a solid line, and a child content if outlined by a dotted line. Hereafter, the parent content assigned the ID 1821 "ID2" is referred to as the parent content "ID2", and the child content assigned the ID 1853 "ID2" is referred to as the child content "ID2".

Referring to FIGS. 6 and 7, the following explains a process for moving, under the above-described condition, the parent content "ID2" stored in the storage apparatus A1000 to the storage apparatus B2000.

First, in the storage apparatus A1000, a user gives an instruction for moving "ID2", which is the ID of the content (hereafter "content ID") to the storage apparatus B2000. The input unit 1900 of the storage apparatus A1000 detects the instruction, and informs the control unit 1600 of (i) the moving to be executed, (ii) the instructed content ID "ID2" and (iii) the storage apparatus ID "B" to which the content needs to be moved (Step S500).

Once having been informed of the moving, the control unit 1600 judges whether or not the moving is possible (Step S501). Here, the control unit 1600 makes two judgments. One is whether or not the storage apparatus 2000, which is the move destination, is in the same group—that is, whether or not the storage apparatus 2000 is connected to the home network. The other is whether or not the content to be moved is a parent content.

The control unit 1600 requests the content information management unit 1700 to make the above two judgments.

After the request, the content information management unit 1700 makes the judgments by referencing the tables stored in the management information storage unit 1800. To be specific, the content information management unit 1700 references the connected apparatus table 1810 and, if "B" is included therein as one of the clients 1812, judges that the storage apparatus 2000 is in the same group. The content information management unit 1700 also references the parent content table 1820, and if "ID2" is included therein as one of the IDs 1821, judges that the content to be moved is a parent content.

The content information management unit 1700 returns results of the two judgments back to the control unit 1600.

After receiving the results of the judgments, the control unit 1600 judges that the moving is possible if the following conditions are met: (i) the move destination apparatus is in the same group, and (ii) the content is the parent content (the Y branch of Step S501). If not, the control unit 1600 judges that the moving is not possible (the N branch of Step S501), and consequently instructs the output unit 1950 to display an error message indicating that the moving is not possible, terminating the process. As indicated, the output unit 1950 displays the error message on the display (Step S506).

If the moving is judged to be possible, the control unit 1600 sends information regarding the parent content "ID2" from within the parent content table 1820 to the storage apparatus B2000 (Step S502). In other words, information regarding the ID 1821 "ID2", namely the ID 1821 "ID2", the content name 1822 "XXXX", the copy destination apparatus ID 1823 "C", and the copy history 1821 "2004/10/218:25:40", are sent to the storage apparatus B2000.

In the storage apparatus B2000, the controller 1600 receives, via the reception unit 1100, the information regarding the parent content "ID2", and instructs the content information management unit 1700 to create the information regarding the parent content "ID2" into the parent content table 1820.

Upon receiving the instruction, the content information management unit 1700 of the storage apparatus B2000 creates the information regarding the parent content "ID2" into the parent content table stored in the management information storage unit 1800 (Step S510, see the parent content table 5220 in FIG. 7).

Next, in the storage apparatus A1000, the control unit 1600 instructs the copy destination apparatus of the parent content "ID2" to rewrite the parent apparatus ID 1852 included in the child content table.

More specifically, the control unit 1600 instructs the storage apparatus "C", which is indicated by the copy destination apparatus ID 1823 and corresponds to the ID 1821 "ID2" included in the parent content table 1820, to rewrite the parent apparatus ID 1852 from "A" to "B" (Step S503).

In the storage apparatus C3000, the control unit 1600 receives, via the reception unit 1100, the instruction to rewrite the parent apparatus ID 1852 from "A" to "B", and instructs the content information management unit 1700 to rewrite the parent apparatus. ID 1821 from "A" to "B".

As instructed, the content information management unit 1700 of the storage apparatus C3000 rewrites the parent apparatus ID 1852, which corresponds to the ID 1853 "ID2" included in the child content table 5100 stored in the management information storage unit 1800, into "B" (Step S520, see the child content table 5110 in FIG. 7).

After the above instruction, the control unit 1600 of the storage apparatus A1000 deletes the information regarding the parent content "ID2" from the parent content table 1820 (see the parent content table 5010 in FIG. 7), and instructs the content information management unit 1700 to create the move-destination table 1830.

As instructed, the content information management unit 1700 requests the management information storage unit 1800 to create the move destination table 1830 that indicates the parent content "ID2" having been moved to the storage apparatus "B". The management information storage unit 1800 accordingly creates the move destination table 1830 (Step S504, see the move destination table 5020 in FIG. 7).

Afterward, in the storage apparatus A1000, the control unit 1600 provides the read unit 1400 with an address of the storage apparatus the content "ID2" is stored in. At the same time, the control unit 1600 instructs the read unit 1400 to (i) read the content, (ii) provide the read content to the send unit 1500, and (iii) once the content is provided to the send unit 1500, delete the content that is left in the storage apparatus A1000. The aforementioned address is managed in the management information storage unit 1800, and can be obtained therefrom via the content information management unit 1700.

The control unit 1600 also instructs the send unit 1500 to send the content that has been received from the read unit 1400 to the storage apparatus B2000.

As instructed, the read unit 1400 reads the content and provides it to the send unit 1500. After providing the content to the sent unit 1500, the read unit 1400 deletes the content that is left in the storage apparatus A1000. The send unit 1500 sends the content that has been received from the read unit 1400 to the storage apparatus B2000 (Step S505).

Upon reception of the content from the storage apparatus A1000, the control unit 1600 of the storage apparatus B2000 instructs the content information management unit 1700 to store the content. As instructed, the content information management unit 1700 stores the content into the management information storage unit 1800 (Step S511).

The move destination table 5020 created at Step S504 is utilized when, for example, the storage apparatus C is outside the home network thus cannot rewrite the parent apparatus ID 1852 promptly, even if the control unit 1600 of the storage apparatus A1000 has instructed the storage apparatus C3000 to rewrite the parent apparatus ID 1852 included in the child content table. When the storage apparatus C returns to and gets reconnected to the home network, the storage apparatus C checks if the parent content, which has created the child content stored in the storage apparatus C, has been moving to a different storage apparatus. If so, the storage apparatus C rewrites the parent apparatus ID included in the child content table stored therein.

In order for the storage apparatus C to do so, the storage apparatus A, which once was a server, finds out which storage apparatus currently stores the parent content by tracing the move destination ID included in the move destination table 5020, and then informs the apparatus storage C of the current server. Or, the storage apparatus A may simply inform the apparatus storage C of the move destination apparatus, so that the storage apparatus C can trace the move destination apparatus to find out the current server.

In order to move a parent content to a different server, conventional technologies have required all the child contents to be deleted, a parent content to be moved, then the child contents to be re-created, which took quite amount of time. On the other hand, in the present case, the move of the parent content does not accompany the deletion of the child contents. Therefore, it is possible to immensely cut down the time and effort it has conventionally taken to move the parent content.

<2. Process for Interchanging Statuses of Parent Content and Child Content>

Figure 8:
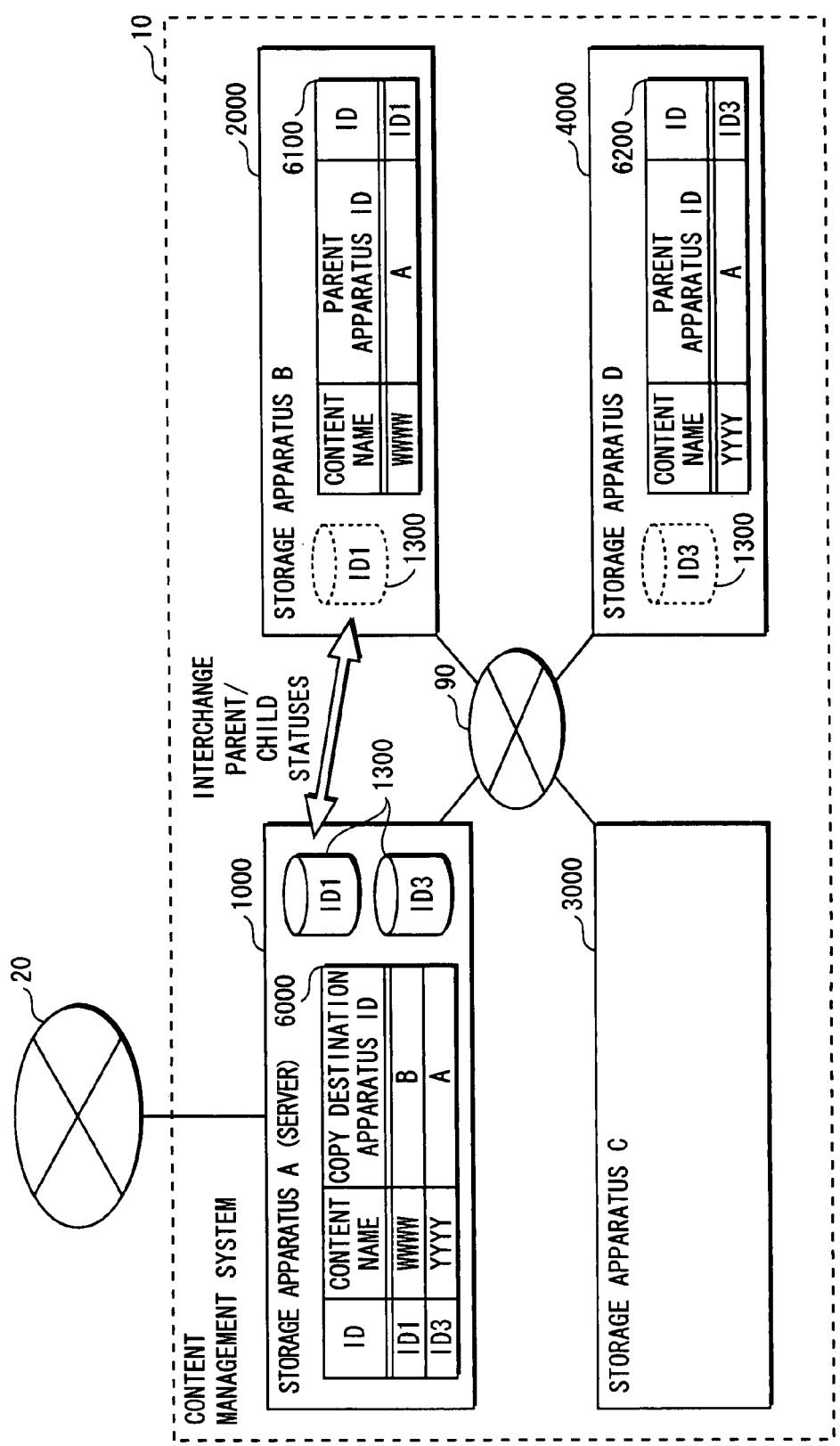
FIG. 8 is a diagram showing contents and content management information stored in the storage apparatuses of the content management system, in the case of interchanging parent/child statuses of the parent content and the child content.
Figure 9:
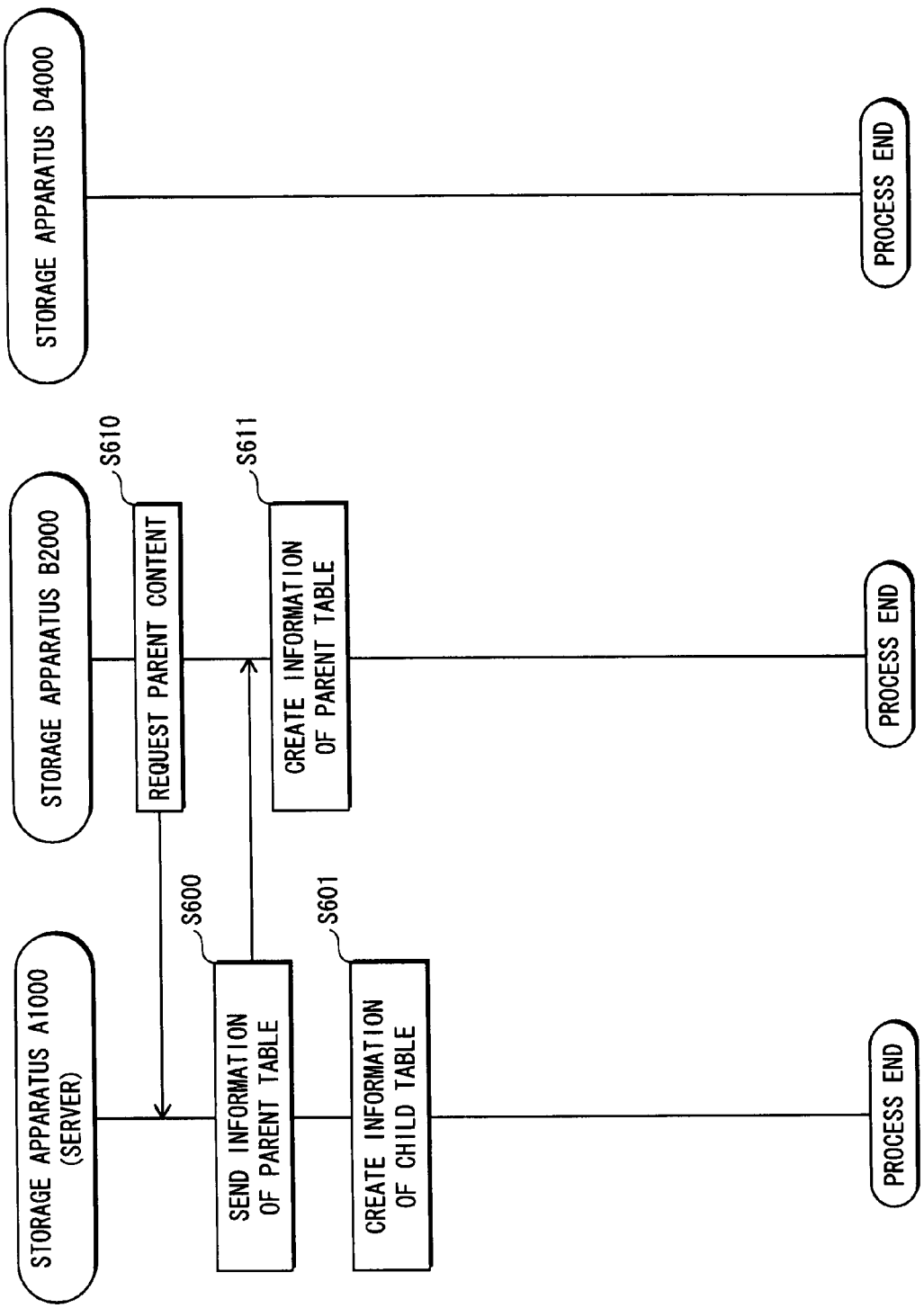
FIG. 9 is a flowchart showing processes performed by the storage apparatuses for interchanging the parent/child statuses of the parent content and the child content.
Figure 10:
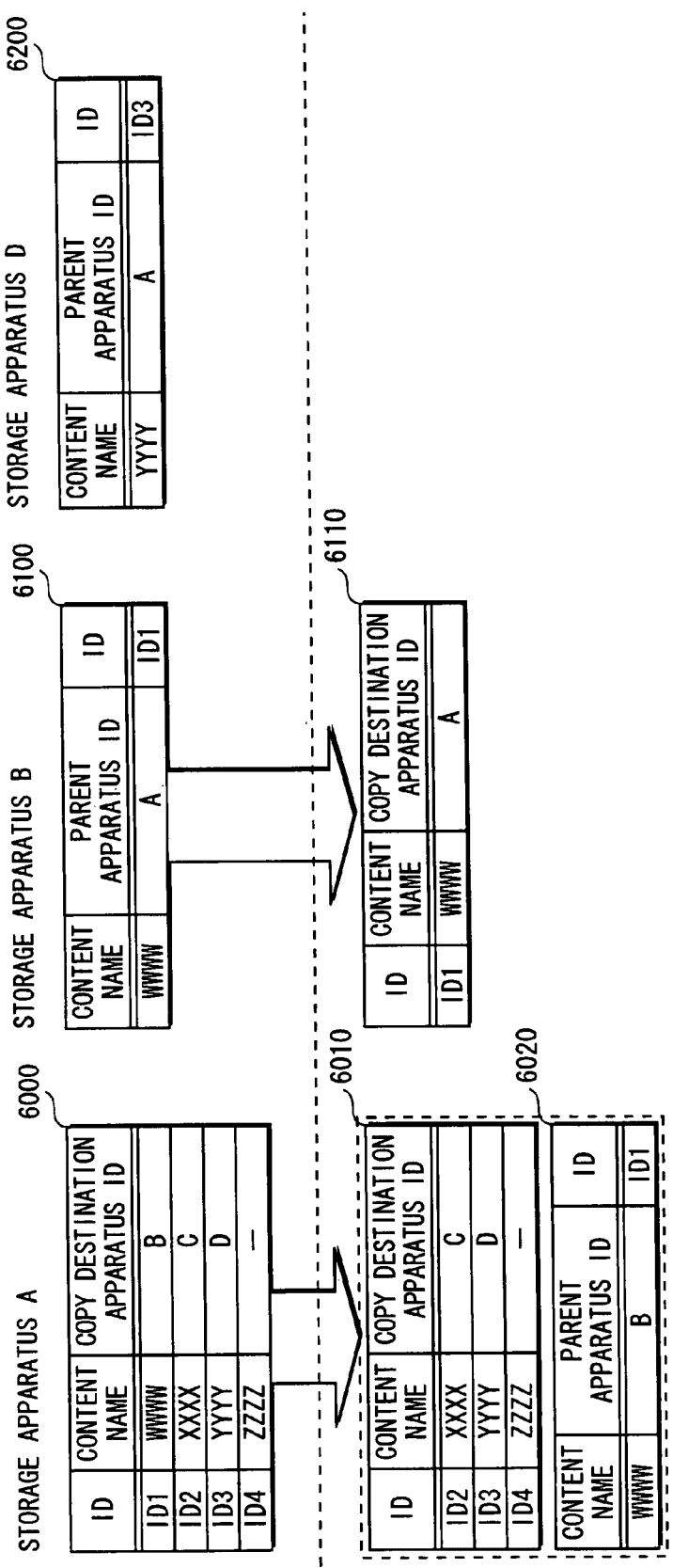
FIG. 10 is a diagram showing how storage apparatus management information changes when interchanging the parent/child statuses of the parent content and the child content.

Described below with reference to FIGS. 8 through 10 is a process for interchanging the statuses, of the parent content and the child content. FIG. 8 is a diagram showing contents and the content management information stored in the storage apparatuses. FIG. 9 is a flowchart showing processes performed by the storage apparatuses. FIG. 10 is a diagram showing how storage apparatus management information changes.

The tables shown in FIG. 10 are stored in the management information storage apparatuses 1800 of the storage apparatuses A, B and D. FIG. 10 shows how these tables change by arranging them in time series as indicated by arrows.

Described hereinafter is a case where the parent content "ID1" stored in the storage apparatus A1000 and the child content "ID1" stored in the storage apparatus B2000 are interchanged.

As shown in FIG. 8, a parent content table 6000 is stored in the management information storage unit 1800 of the storage apparatus A1000. The content storage unit 1300 of the storage apparatus A1000 stores therein a parent content whose content name 1822, ID 1821 and copy destination apparatus ID 1823 are, respectively, "WWWW", "ID1" and "B". That is, regarding this content, the storage apparatus A1000 is a server.

It is regarded that the storage apparatus A1000 also stores other parent contents including a parent content "ID3" (see the parent content table 6000 in FIG. 9).

A child content table 6100 is stored in the management information storage unit 1800 of the storage apparatus B2000. The content storage unit 1300 of the storage apparatus B2000 stores a child content whose content name 1851, the parent apparatus ID 1852 and the ID 1853 are, respectively, "WWWW", "A" and "ID1".

A child content table 6200 is stored in the management information storage unit 1800 of the storage apparatus D4000. The content storage unit 1300 of the storage apparatus D4000 stores a child content whose content name 1851, parent apparatus ID 1852 and the ID 1853 are, respectively, "YYYY", "A" and "ID3".

Referring to FIGS. 9 and 10, the following explains a process for interchanging, under the above-described condition, statuses of the parent content "ID1" stored in the storage apparatus A1000 and the child content "ID1" stored in the storage apparatus B2000.

First, in the storage apparatus B2000, a user gives an instruction for converting the child content "ID1" into the parent content.

In the storage apparatus B2000, the input unit 1900 detects the instruction, and notifies the controls unit 1600 of (i) the conversion to be executed and (ii) the instructed content ID "ID1".

After the notification, the control unit 1600 of the storage apparatus B2000 submits, to the content information management unit 1700, an inquiry about the parent apparatus ID of the child content "ID1".

After receiving the inquiry, the content information management unit 1700 references the child content table 6100 stored in the management information storage unit 1800, and notifies the control unit 1600 that the parent apparatus ID of the child content "ID1" is "A".

Following the notification, the control unit 1600 of the storage apparatus B2000 requests the parent apparatus ID "A", which has been notified thereto, to send information regarding the content "ID1" that is included in the parent content table (Step S610).

Following the request, the control unit 1600 of the storage apparatus A1000 instructs the content information management unit 1700 to read information regarding the parent content "ID1".

As instructed, the content information management unit 1700 reads the information regarding the ID 1821 "ID1" from the parent content table 6000, and informs the control unit 1600 of the read information.

Specifically, the aforementioned information regarding the ID 1821 "ID1" refers to the content name 1822 "WWWW" and the copy destination apparatus ID 1823 "B". If the parent content has other copies thereof that are stored in other storage apparatuses, the content information management unit 1700 reads all the copy destination apparatus IDs 1823 of the parent content and informs the control unit 1600 of the read copy destination apparatus IDs 1823.

After receiving the information regarding the parent content table, the control unit 1600 of the storage apparatus A1000 provides the copy destination apparatus ID 1823 that is taken out from the received information to the storage apparatus that has made the aforementioned request.

Specifically, the control unit 1600 sends the copy destination apparatus ID 1823 "B" to the storage apparatus "B" that has requested the information.

After receiving all the copy destination apparatus IDs 1823 of the parent content "ID1" from the storage apparatus A1000, the control unit 1600 of the storage apparatus B2000 instructs the content information management unit 1700 to delete the child content table indicating the child content "ID1", and instead to create a parent content table 6110 indicating the parent content "ID1".

Here, in the parent content table 6110, the content name 1822 remains the same as the content name 1851 included in the child content table 6100. Among all the received copy destination apparatus IDs, the destination apparatus ID that indicates "B" gets rewritten into "A" (Step S611). The rest of the received copy destination apparatus IDs 1823 are kept as they are when included in the parent content table 6110.

More specifically, the content information management unit 1700 creates the parent content table 6110 including the ID 1821 "ID1", the content name 1822 "WWWW" and the copy destination apparatus ID 1823 "A" (see FIG. 10).

On the other hand, after the information regarding the parent content "ID1" is sent to the storage apparatus B2000, the control unit 1600 of the storage apparatus 1000 instructs the content information management unit 1700 to (i) delete the information regarding the parent content "ID1" from the parent content table, and (ii) create a child content table 6020 indicating the parent apparatus ID "B".

After receiving the instruction, the content information management unit 1700 creates the child content table 6020 indicating the content name 1851 "WWWW", which originates from the content name 1822 included in the parent content table 6000, the parent apparatus ID 1852 "B", and the ID 1853 "ID1" (Step S601). The content information management unit 1700 also deletes the information regarding the parent content "ID1" from the parent content table 6000; the parent content table 6000 with no such information included is referred to as a parent content table 6010.

At this point, the parent content table indicating the content "ID1" has been created in the storage apparatus B2000, whereas the child content table indicating the content "ID1" has been created in the storage apparatus A1000.

It should be noted that no change is made to the child content table 6200, as the storage apparatus D4000 does not store a copy of the content "ID1".

The present case has been described under the assumption that the child content "ID1" stored in the storage apparatus B2000 is the only child content existing. If there exists more than one child content "ID1" stored in other storage apparatuses, these other storage apparatuses are requested to rewrite the parent apparatus ID included in the child content table, which is stored in each of the other storage apparatuses, into "B". This process is the same as Steps S503 and S520 in FIG. 6.

In order to interchange statuses of a parent content and its copy or one of its copies, the conventional technologies have required the following tasks: deleting all of the copies by, for example, deleting the child contents; moving the parent content (original content); and recopy the content back into storage apparatuses that previously stored the content, either a parent content or a child content. In contrast, in the present case, there is no need at all to copy the content, and therefore the time and effort it has conventionally taken to exchange the parent content with its copy can be cut down immensely.

It is regarded in the present case that, when interchanging the statuses of the parent content and the child content, the new child content does not take over a time period set for the old child content, the time period during which the old child content is valid. However, the storage apparatus B may send information regarding such a time period to the storage apparatus A, so that the storage apparatus A can, in the course of creating the child content table 6020, set a new time period during which the new parent content will be valid.

<3. Process for Moving Child Content>

Described below is a case wherein the child content is moved to a different storage apparatus.

The conventional technologies have never allowed the moving of the child content. In order to move the child content to a different apparatus, a user conventionally has had to go through the tasks of first deleting the existing child content, and then newly creating a child content into the different apparatus.

In contrast, the present invention enables the user to move the child content to a different apparatus without the aforementioned, troublesome tasks required by the conventional technologies.

The present process can be achieved by a combination of (i) process for moving the parent content and (ii) process for interchanging the statuses of the parent content and the child content.

For this reason, the present section mostly explains when to move the parent content and to interchange the statuses of the parent content and the child content; processes for sending various information, creating tables, etc., are the same as those that are previously described.

The present case is explained under the assumption that the storage apparatus A1000 stores the parent content "ID1", and the storage apparatus B2000 stores the child content "ID1". In the following explanation, the child content stored in the storage apparatus B2000 is going to be moved to the storage apparatus D4000.

Figure 11:
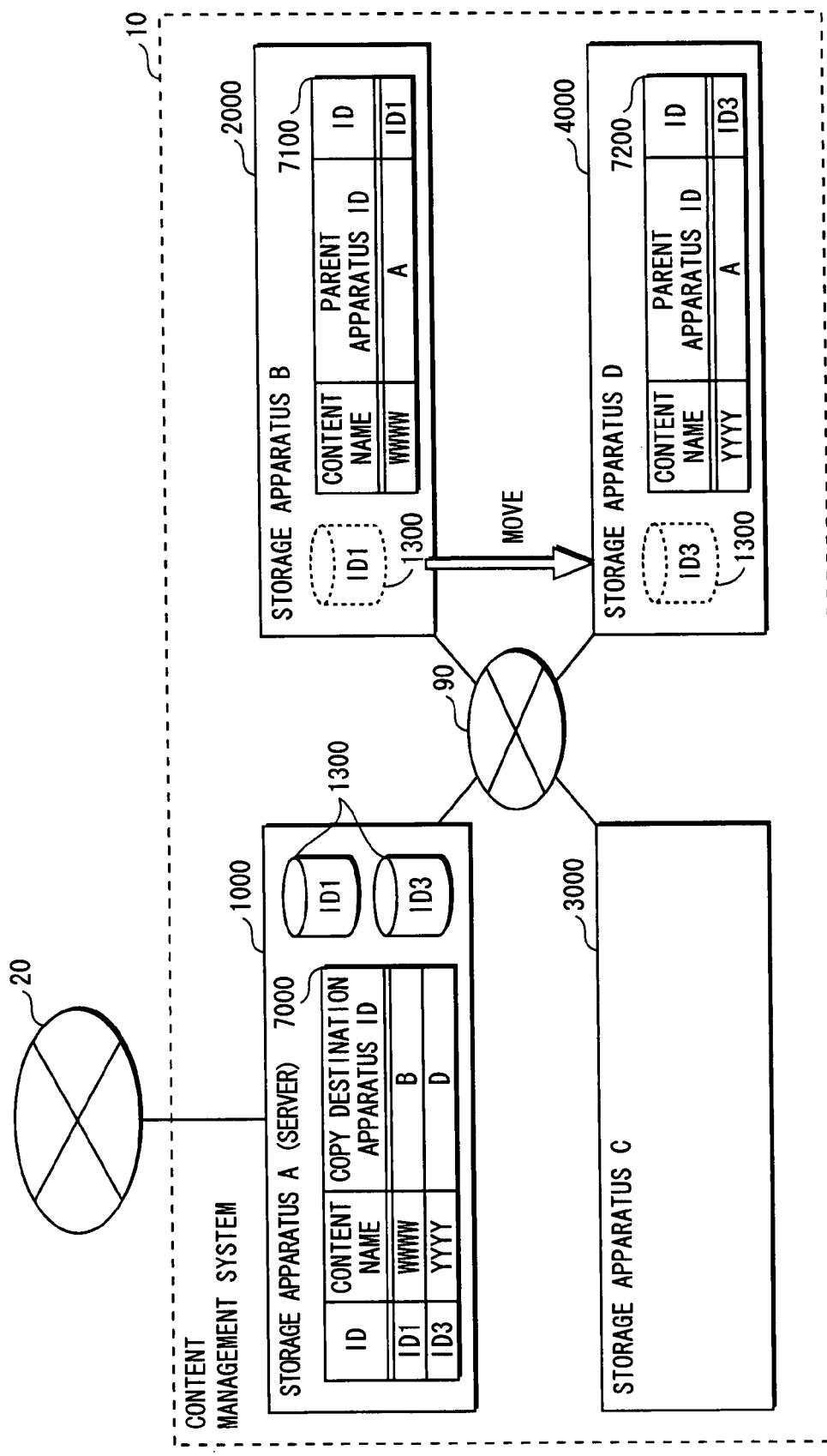
FIG. 11 is a diagram showing contents and content management information stored in the storage apparatuses of the content management system, in the case of moving the child content.
Figure 12:
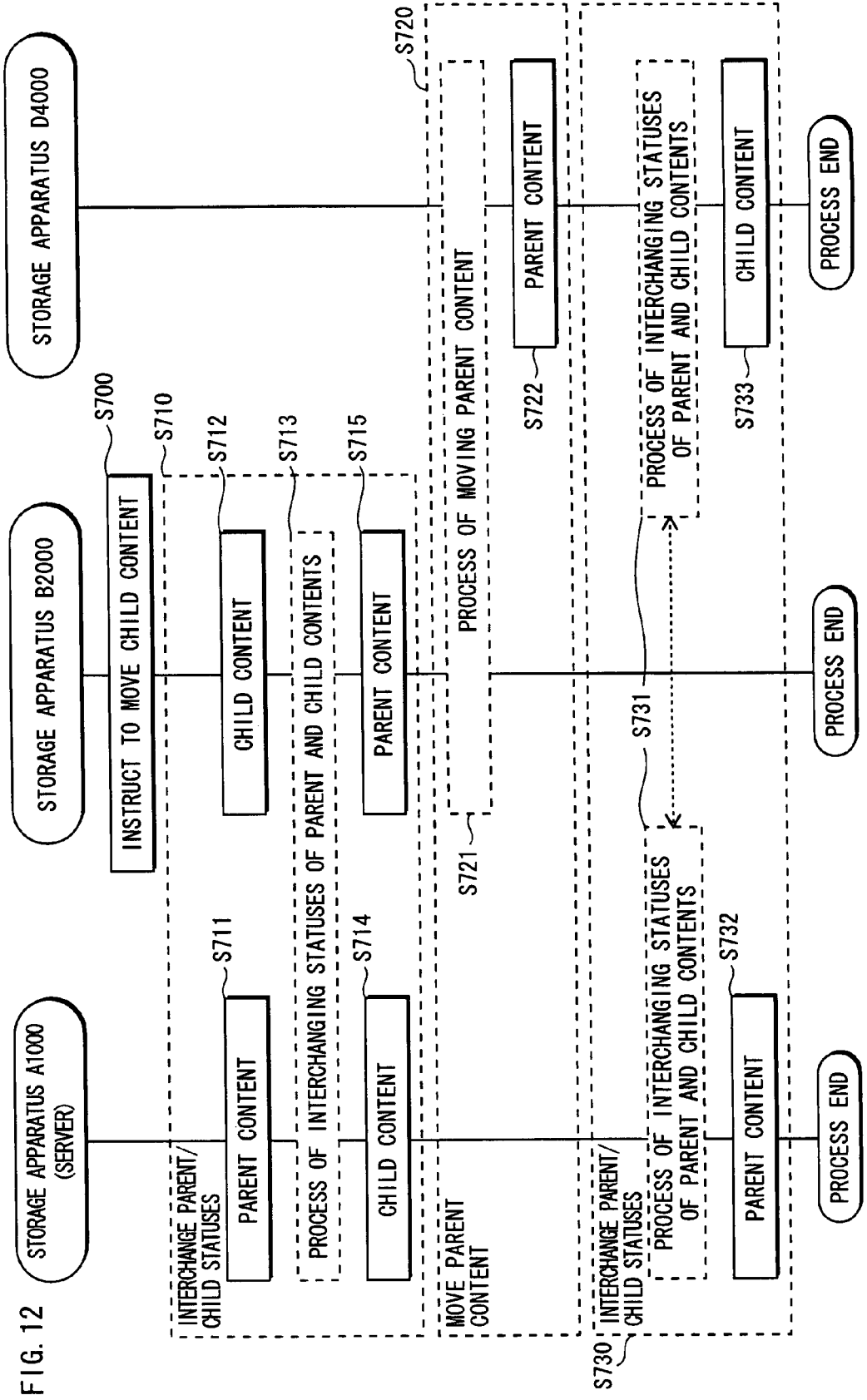
FIG. 12 is a flowchart showing processes performed by the storage apparatuses for moving the child content.
Figure 13:
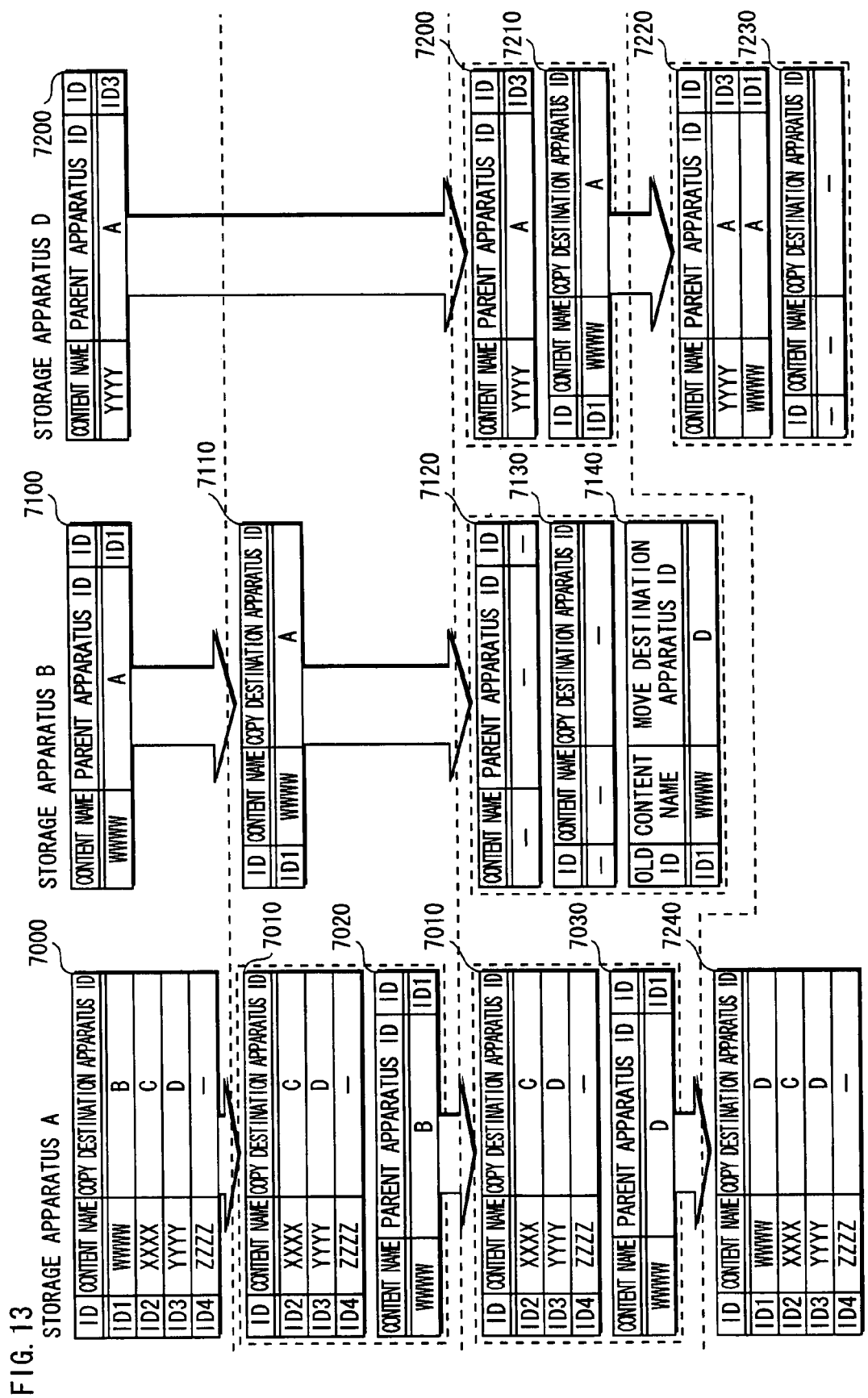
FIG. 13 is a diagram showing how storage apparatus management information changes when moving the child content.

FIG. 11 is a diagram showing contents and content management information stored in the storage apparatuses of the content management system. FIG. 12 is a flowchart showing processes performed by the storage apparatuses. FIG. 13 is a diagram showing how storage apparatus management information changes.

The tables shown in FIG. 13 are stored in the management information storage units 1800 of the storage apparatuses A, B and D. FIG. 13 shows how these tables change by arranging them in time series as indicated by arrows.

As shown in FIG. 11, a parent content table 7000 is stored in the management information storage unit 1800 of the storage apparatus A1000. The content storage unit 1300 of the storage apparatus A1000 stores a parent content whose content name 1822, ID 1821 and copy destination apparatus ID 1823 are, respectively, "WWWW", "ID1" and "B".

A child content table 7100 is stored in the management information storage unit 1800 of the storage apparatus B2000. The content storage unit 1300 of the storage apparatus B2000 stores a child content whose content name 1851, parent apparatus ID 1852 and the ID 1853 are, respectively, "WWWW", "A" and "ID1".

A child content "ID3" is stored in the storage apparatus D4000.

The following describes the process for moving the child content with reference to FIGS. 12 and 13.

First, a user gives an instruction for moving the child content "ID1" from the storage apparatus B2000 to the storage apparatus D4000 (Step S700).

Note that at the time of the instruction, the parent content "ID1" is stored in the storage apparatus A1000 (Step S711) while the child content "ID1" is stored in the storage apparatus B2000 (Step S712).

After receiving the instruction from the user, the control unit 1600 of the storage apparatus B2000 starts a process with the storage apparatus A1000 that stores the parent content "ID1".

Specifically, the control unit 1600 interchanges the statuses of the parent content and the child content by exchanging (i) parent content information regarding the parent content "ID1", which is stored in the storage apparatus A1000, with (ii) child content information regarding the child content "ID1", which is stored in the storage apparatus B2000 (Step S710). This is the same as the process that is previously described with use of FIGS. 8 through 10.

After the process of interchanging the statuses of the parent content and the child content (Step S713), the child content "ID1" is stored in the storage apparatus A1000 (Step S714, see a parent content table 7010 and a child content table 7020 in FIG. 13), while the parent content "ID1" is stored in the storage apparatus B2000 (Step S715, see a parent content table 7110 in FIG. 13).

Next, the control unit 1600 of the storage 2000 moves the parent content "ID1", now stored in the storage apparatus B2000, to the storage apparatus D4000 (Step S720).

More specifically, the control unit 1600 moves, to the storage apparatus D4000, (i) the parent content information regarding the parent content "ID1" and (ii) the content "ID1" that are stored in the storage apparatus B2000. The control unit 1600 then rewrites the information regarding the child content "ID1" now stored in the storage apparatus A1000. This is the same as the process that is previously described with use of FIGS. 5 through 7.

The process for moving the parent content (Step S721) puts the parent content "ID1" from the storage apparatus B2000 to the storage apparatus D4000 (Step S722, see a parent content table 7210, the child content table 7020 and a move destination table 7140 in FIG. 13). At this point, nothing is stored in the storage apparatus B2000 (see a child content table 7120 and a parent content table 7130 in FIG. 13).

Accordingly, regarding the information indicating the child content "ID1" stored in the storage apparatus A1000, the storage apparatus ID is rewritten from "B" to "D" (see a child content table 7030 in FIG. 13).

Next, statuses of the parent content stored in the storage apparatus D4000 and the child content stored in the storage apparatus A1000 are interchanged (Step S730).

After the process for interchanging the statuses of the parent content and the child content (Step S731), the parent content "ID1" is stored in the storage apparatus A1000 (Step S732, see a parent content table 7240 in FIG. 13) whereas the child content "ID1" is stored in the storage apparatus D4000 (Step S733, see a child content table 7220 and the parent content table 7230 in FIG. 13).

This way the child content "ID1" that was originally stored in the storage apparatus B2000 is moved to the storage apparatus D4000.

<4. Process for Creating Copy of Child Content>

Described below is a case wherein a copy of a child content is created.

Conventionally, it has been impossible to create a copy of a child content; copying of content is allowed only when the content is parent content.

In contrast, the present invention gives a user the ability to freely create a copy of a child content and store the copy into a different apparatus.

This process can be achieved by a combination of (i) the aforementioned process for interchanging the statuses of the parent content and the child content and (ii) conventional technology for creating a child content.

For this reason, the present section mostly explains when to move the parent content and to interchange the statuses of the parent content and the child content; processes for transmitting various information, creating tables, etc., are the same as those that are previously described.

In the present case, the parent content "ID1" is stored in the storage apparatus A1000, whereas the child content "ID1" is stored in the storage apparatus B2000. In the following description, a child content is going to be created into the storage apparatus D4000 from the child content stored in the storage apparatus B2000.

Figure 14:
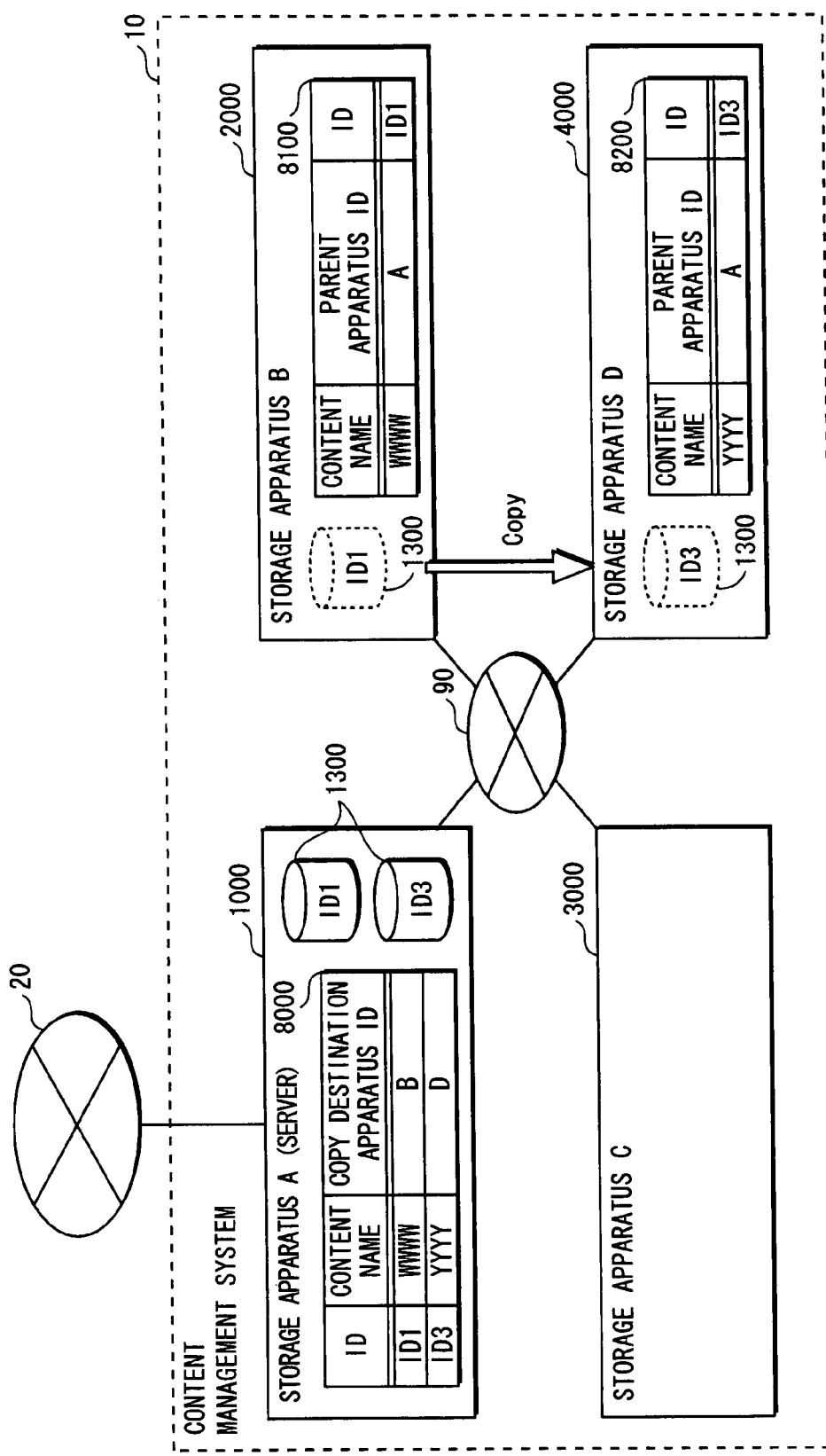
FIG. 14 is a diagram showing contents and storage apparatus management information stored in the storage apparatuses of the content management system, in the case of making a copy of the child content.

FIG. 14 is a diagram showing contents and content management information stored in the storage apparatuses of the content management system. FIG. 15 is a flowchart showing processes performed by the storage apparatuses. FIG. 16 is a diagram showing how storage apparatus management information changes.

The tables shown in FIG. 16 are stored in the management information storage apparatuses 1800 of the storage apparatuses A, B and C. FIG. 16 shows how these tables change by arranging them in time series as indicated by arrows.

As shown in FIG. 14, a parent content table 8000 is stored in the management information storage unit 1800 of the storage apparatus A1000. The content storage unit 1300 of the storage apparatus A1000 stores therein a parent content whose content name 1822, ID 1821 and copy destination apparatus ID 1823 are, respectively, "WWWW", "ID1" and "B".

A child content table 8100 is stored in the management information storage unit 1800 of the storage apparatus B2000. The content storage unit 1300 of the storage apparatus B2000 stores a child content whose content name 1851, parent apparatus ID 1852 and ID 1853 are, respectively, "WWWW", "A" and "ID1".

A child content "ID3" is stored in the storage apparatus D4000.

Described below with reference to FIGS. 15 and 16 is the process for creating the child content.

First, a user gives an instruction for copying the child content "ID" from the storage apparatus B2000 to the storage apparatus (Step S800).

At this point, the parent content "ID1" is stored in the storage apparatus A1000 (Step S811) while the child content "ID1" is stored in the storage apparatus B2000 (Step S812).

After receiving the instruction, the control unit 1600 of the storage apparatus B2000 starts the process with the storage apparatus A1000 that stores the parent content "ID1".

To be specific, the control unit 1600 interchanges the statuses of the parent content and the child content by exchanging (i) parent content information regarding the parent content "ID1", which is stored in the storage apparatus A1000, with (ii) child content information regarding the child content "ID1", which is stored in the storage apparatus B2000 (Step S810). This is the same as the process that is previously described with use of FIGS. 8 through 10.

After the process for interchanging the statuses of the parent content and the child content (Step S813), the child content "ID1" is stored in the storage apparatus A1000 (Step S814, see a child content table 8020 in FIG. 13), while the parent content "ID1" is stored in the storage apparatus B2000 (Step S815, see a parent content table 8110 in FIG. 16).

Next, the child content is created from the parent content, which is stored in the storage apparatus B2000, into the storage apparatus D4000 (Step S820).

As a result, the child content "ID1" gets to be stored in the storage apparatus D4000 (Step S821, see a child content table 8210 in FIG. 16).

Next, the parent content stored in the storage apparatus B2000 and the child content stored in the storage apparatus A1000 are interchanged again (Step S830).

After the process for interchanging the parent content and the child content (Step S831), the parent content "ID1" is stored in the storage apparatus A1000 (Step S832, see a parent content table 8030 in FIG. 16), whereas the child content "ID1" is stored in the storage apparatuses B2000 and D4000 (Step S833, see a parent content table 8130 and child content tables 8120 and 8220).

As a result of the above Steps, the child content "ID1" that was originally stored in the storage apparatus B2000 has been copied to the storage apparatus D4000.

<Additional Remarks>

The content management system of the present invention has been described based on, but is not limited to, the above embodiment. The present invention can be also achieved with a modified version of the content management system. The following are examples of such modifications.

(1) In the above embodiment, the home network 90 is depicted as the small-scale, in-home network constructed by the wireless LAN and the like. However, the home network 90 may be other types of small-scale networks covering an office, apartment building, etc.

(2) In the <4. Process for Creating Copy of Child Content> section above, the copy of the parent content is created after interchanging the statuses of the parent content and the child content. However, the child content may be created through a different process.

For example, in the case of copying the child content stored in the storage apparatus B to the storage apparatus D, the following process may be performed instead. First, the storage apparatus B sends the content and the parent apparatus ID to the storage apparatus D. The storage apparatus B also notifies the storage apparatus A that it has created the child content. Then, each storage apparatus creates management information therein. This process allows the storage apparatuses to create a child content directly from another child content.

(3) In the above embodiment, the storage apparatuses do not move the parent content to an apparatus that is outside the group (i.e., an apparatus that is not connected to the home network). However, the storage apparatuses may move the parent content to such an outside apparatus, if all of the existing child contents are deleted.

(4) It is possible to distribute a program for making a CPU execute the various control processes (see FIG. 2, etc.) that can realize the functions of the storage apparatuses shown in the above embodiment. The program can be distributed (i) with the program recorded on a recording medium or (ii) via various types of communication paths. Examples of such a recording medium include an IC card, an optical disc, a flexible disc, a ROM, and a flash memory. For the purpose of use, the distributed program may be stored in a memory that can be read by CPU stored in an apparatus. With CPU executing the program, the functions of the storage apparatuses shown in the above embodiment are realized.

(5) The function blocks of the control unit 1600, the content information management unit 1700 and the management information storage unit 1800 in each of the storage apparatuses are typically realized as an LSI, which is an integrated circuit. These function blocks may be separately accumulated as an individual chip. Or, part or all of these function blocks may be included on one chip.

Here, the LSI may be an IC, a system LSI, a super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

If a semiconductor technology or related technologies give birth to a new circuit-integrating technology that would replace the LSI, such technologies may be used for integrating the functional blocks. One such possibility is an application of biotechnology.

INDUSTRIAL APPLICABILITY

In a system that manages a content with use of a home network and the like, the present invention is useful for enhancing user-friendliness for content users while complying with conditions restricting copying of the content.

The invention claimed is:

1. A content management system comprising a plurality of storage apparatuses that can communicate with one another,
    wherein a first storage apparatus, which is one of the plurality of storage apparatuses, stores therein, in correspondence, (i) first content and (ii) copy destination information indicating one of the plurality of storage apparatuses to which the first content has been sent,
    wherein the first storage apparatus includes:
        a send unit operable to send the first content and the copy destination information therefrom to a second storage apparatus, which is another one of the plurality of storage apparatuses and is not indicated by the copy destination information; and
        a delete unit operable to delete the first content and the copy destination information from the first storage apparatus after the send unit has sent the first content and the copy destination information,
    wherein the second storage apparatus includes an add unit operable to additionally store, in correspondence, the first content and the copy destination information received from the first storage apparatus into the second storage apparatus,
    wherein the one of the storage apparatuses indicated by the copy destination information stores therein, in correspondence, (i) second content that is the same as the first content and (ii) copy source information indicating one of the plurality of storage apparatuses in which the first content and the copy destination information are stored at a time of acquisition of the second content, and
    wherein the one of the plurality of storage apparatuses indicated by the copy destination information includes a rewrite unit operable to, when the first storage apparatus sends the first content and the copy destination information to the second storage apparatus, rewrite the copy source information such that the copy source information indicates the second storage apparatus.

2. The content management system of claim 1,
    wherein the send unit sends the first content and the copy destination information to the second storage apparatus only when the second storage apparatus is a designated storage apparatus.

3. A storage apparatus, which is one of a plurality of storage apparatuses that can communicate with one another and are included in a content management system, the storage apparatus comprising:
    a storage unit storing therein, in correspondence, (i) content and (ii) copy destination information indicating one of the plurality of storage apparatuses to which the content has been sent;
    a send unit operable to send the content and the copy destination information to a predetermined storage apparatus, which is another one of the plurality of storage apparatuses and is not indicated by the copy destination information; and
    a delete unit operable to delete the content and the copy destination information from the storage unit after the send unit has sent the content and the copy destination information to the predetermined storage apparatus.

4. A storage apparatus, which is one of a plurality of storage apparatuses that can communicate with one another and are included in a content management system, the plurality of storage apparatuses including, in addition to the storage apparatus, (i) a first storage apparatus storing therein, in correspondence, (a) first content and (b) copy destination information indicating one of the plurality of storage apparatuses to which the first content has been sent, and (ii) a second storage apparatus which is not indicated by the copy destination information, the storage apparatus comprising:
    a storage unit storing therein, in correspondence, (i) second content that is the same as the first content and (ii) copy source information indicating one of the plurality of storage apparatuses in which the first content and the copy destination information are stored at a time of acquisition of the second content;
    a reception unit operable to receive latest copy source information indicating that the first content and the copy destination information have been sent to the second storage apparatus; and
    a rewrite unit operable to rewrite the copy source information stored in the storage unit into the received latest copy source information.

5. A content management system comprising a plurality of storage apparatuses that can communicate with one another,
    wherein a first storage apparatus, which is one of the plurality of storage apparatuses, stores therein, in correspondence, (i) first content and (ii) copy destination information indicating two or more of the plurality of storage apparatuses to which the first content has been sent, the two or more of the plurality of storage apparatuses including a second storage apparatus,
    wherein the first storage apparatus includes:
        a send unit operable to send the copy destination information therefrom to the second storage apparatus, the copy destination information indicating the two or more of the plurality of storage apparatuses excluding the second storage apparatus; and
        a unit operable to (i) delete the copy destination information from the first storage apparatus after the send unit has sent the copy destination information indicating the two or more of the plurality of storage apparatuses excluding the second storage apparatus, and (ii) newly store, in correspondence with the first content, information indicating the second storage apparatus as copy source information into the first storage apparatus,
    wherein the second storage apparatus stores therein, in correspondence, (i) second content that is the same as the first content and (ii) copy source information indicating one of the plurality of storage apparatuses in which the first content and the copy destination information are stored at a time of acquisition of the second content, and
    wherein the second storage apparatus includes a unit operable to delete the copy source information from the second storage apparatus after having received, from the first storage apparatus, the copy destination information indicating the two or more of the plurality of storage apparatuses excluding the second storage apparatus, and newly store, in correspondence with the second content, the copy destination information received from the first storage apparatus into the second storage apparatus.

6. A storage apparatus, which is one of a plurality of storage apparatuses that can communicate with one another and are included in a content management system, the storage apparatus comprising:
    a storage unit storing therein, in correspondence, (i) content and (ii) copy destination information indicating two or more of the plurality of storage apparatuses to which the content has been sent, the two or more of the plurality of storage apparatuses including a predetermined storage apparatus;

a send unit operable to send, to the predetermined storage apparatus, the copy destination information indicating the two or more of the plurality of storage apparatuses excluding the predetermined storage apparatus; and a unit operable to (i) delete the copy destination information from the storage unit after the send unit has sent the copy destination information indicating the two or more of the plurality of storage apparatuses excluding the predetermined storage apparatus, and (ii) newly store information indicating the predetermined storage apparatus as copy source information in correspondence with the content into the storage unit.

7. A storage apparatus, which is one of a plurality of storage apparatuses that can communicate with one another and are included in a content management system, the plurality of storage apparatuses including, in addition to the storage apparatus, a predetermined storage apparatus storing therein, in correspondence, (i) first content and (ii) copy destination information indicating one of the plurality of storage apparatuses to which the first content has been sent, the storage apparatus comprising:

a storage unit storing therein, in correspondence, (i) second content that the same as the first content and (ii) copy source information indicating one of the plurality of storage apparatuses in which the first content and the copy destination information are stored at a time of acquisition of the second content;

a reception unit operable to receive the copy destination information from the predetermined storage apparatus; and a unit operable to (i) delete the copy source information from the storage unit after the reception unit has received the copy destination information, and (ii) newly store the received copy destination information in correspondence with the second content into the storage unit.

8. A content management method for use in a content management system that includes a plurality of storage apparatuses that can communicate with one another, wherein a first storage apparatus, which is one of the plurality of storage apparatuses, stores therein, in correspondence, (i) first content and (ii) copy destination information indicating one of the plurality of storage apparatuses to which the first content has been sent, the content management method comprising:

sending the first content and the copy destination information from the first storage apparatus to the second storage apparatus, which is another one of the plurality of storage apparatuses and that is not indicated by the copy destination information;

deleting, from the first storage apparatus, the first content and the copy destination information sent during the sending; and storing, in the second storage apparatus, in correspondence, the first content and the copy destination information received from the first storage apparatus, wherein the one of the plurality of storage apparatuses indicated by the copy destination information stores therein, in correspondence, (i) second content that is the same as the first content and (ii) copy source information indicating one of the plurality of storage apparatuses in which the first content and the copy destination information are stored at a time of acquisition of the second content, and wherein the content management method further comprises:

rewriting, when the first storage apparatus sends the first content and the copy destination information to the second storage apparatus, the copy source information stored in the one of the plurality of storage apparatuses indicated by the copy destination information, such that the copy source information indicates the second storage apparatus.

9. A content management method for use in a content management system that includes a plurality of storage apparatuses that can communicate with one another, wherein a first storage apparatus, which is one of the plurality storage apparatuses, stores therein, in correspondence, (i) first content and (ii) copy destination information indicating two or more of the plurality of storage apparatuses including a second storage apparatus, the content has been sent, and performs steps of:

the content management method comprising:

sending the copy destination information from the first storage apparatus to the second storage apparatus, the copy destination information indicating the two or more of the plurality of storage apparatuses excluding the second storage apparatus;

deleting, from the first storage apparatus, the copy destination information after the copy destination information indicating the two or more of the plurality of storage apparatuses excluding the second storage apparatus has been sent in the sending; and newly storing, in the first storage apparatus, information indicating the second storage apparatus as copy source information in correspondence with the first content, wherein the second storage apparatus stores therein, in correspondence, (i) second content that is the same as the first content and (ii) copy source information indicating one of the plurality of storage apparatuses in which the first content and the copy destination information are stored at a time of acquisition of the second content, and wherein the content management method further comprises:

deleting, from the second storage apparatus, the copy source information after receiving, from the first storage apparatus, the copy destination information indicating the two or more of the plurality of storage apparatuses excluding the second storage apparatus; and newly storing, in the second storage apparatus, the copy destination information received from the first storage apparatus in correspondence with the second content.

10. A non-transitory computer readable recording medium having stored thereon a computer program for use in a storage apparatus, the storage apparatus being one of a plurality of storage apparatuses that can communicate with one another and are included in a content management system, wherein the storage apparatus includes a memory storing therein, in correspondence, (i) content and (ii) copy destination information indicating one of the plurality of storage apparatuses to which the content has been sent, and wherein, when executed, the computer program causes the storage apparatus to execute a content management processing method comprising:

sending the content and the copy destination information to a predetermined storage apparatus which is another one of the plurality of storage apparatuses and that is not indicated by the copy destination information; and deleting the content and the copy destination information from the memory after the content and the copy destination information have been sent to the predetermined storage apparatus in the sending.

11. A non-transitory computer readable recording medium having stored thereon a computer program for use in a storage apparatus, the storage apparatus being one of a plurality of storage apparatuses that can communicate with one another and are included in a content management system, wherein the storage apparatus includes a memory storing therein, in correspondence, (i) content and (ii) copy destination information indicating two or more of the plurality of storage apparatuses to which the content has been sent, the two of more of the plurality of storage apparatuses including a predetermined storage apparatus, and wherein, when executed, the computer program causes the storage apparatus to perform a content management processing method comprising:

sending, to the predetermined storage apparatus, the copy destination information indicating the two or more of the plurality of storage apparatuses excluding the predetermined storage apparatus;

deleting the copy destination information from the memory after the copy destination information indicating the two or more of the plurality of storage apparatuses excluding the predetermined storage apparatus has been sent in the sending; and newly storing, into the memory, information indicating the predetermined storage apparatus as copy source information in correspondence with the content.

12. An integrated circuit of a storage apparatus, which is one of a plurality of storage apparatuses that can communicate with one another and are included in a content management system, the integrated circuit comprising:

a storage unit storing therein, in correspondence, (i) content and (ii) copy destination information indicating one of the plurality of storage apparatuses to which the content has been sent;

a send unit operable to send the content and the copy destination information to a predetermined storage apparatus, which is another one of the plurality of storage apparatuses and that is not indicated by the copy destination information; and a delete unit operable to delete the content and the copy destination information from the storage unit after the send unit has sent the content and the copy destination information to the predetermined storage apparatus.

13. An integrated circuit of a storage apparatus, which is one of a plurality of storage apparatuses that can communicate with one another and are included in a content management system, the integrated circuit comprising:

a storage unit storing therein, in correspondence, (i) content and (ii) copy destination information indicating two or more of the plurality of storage apparatuses to which the content has been sent, the two or more of the plurality of storage apparatuses including a predetermined storage apparatus;

a send unit operable to send, to the predetermined storage apparatus, the copy destination information indicating the two or more of the plurality of storage apparatuses excluding the predetermined storage apparatus; and a unit operable to delete the copy destination information from the storage unit after the send unit has sent the copy destination information indicating the two or more of the plurality of storage apparatuses excluding the predetermined storage apparatus, and (ii) newly store, in correspondence with the content, information indicating the predetermined storage apparatus as copy source information into the storage unit.

14. The content management system of claim 1, wherein, among the plurality of storage apparatuses, there is only one storage apparatus that stores therein, in correspondence, the first content and the copy destination information.

15. The content management system of claim 1, wherein the first storage apparatus further includes a move destination information storage unit that, after the first content and the copy destination information have been sent to the second storage apparatus, stores therein information indicating a destination to which the first content and the copy destination information have been sent.

16. The content management system of claim 1, wherein each of the plurality of storage apparatuses includes an output unit operable to play back contents and output video.

17. The content management system of claim 1, wherein the first content is digital data that reproduces at least one of video and audio.

18. The storage apparatus of claim 3, wherein, among the plurality of storage apparatuses, there is only one storage apparatus that stores therein, in correspondence, the content and the copy destination information.

19. The storage apparatus of claim 3, wherein the storage apparatus further includes a move destination information storage unit that, after the content and the copy destination information have been sent to the predetermined storage apparatus, stores therein information indicating a destination to which the content and the copy destination information have been sent.

20. The storage apparatus of claim 3, wherein each of the plurality of storage apparatuses includes an output unit operable to play back contents and output video.

* * * * *